United States Patent [19]
Bae et al.

[11] Patent Number: 5,963,265
[45] Date of Patent: Oct. 5, 1999

[54] CLOSED-CAPTION BROADCASTING AND RECEIVING METHOD AND APPARATUS SUITABLE FOR SYLLABLE CHARACTERS

[75] Inventors: Jum-Han Bae, Suwon; Jong-Hwa Won, Seoul, both of Rep. of Korea

[73] Assignee: Samsung Electronics Co., Ltd., Suwon, Rep. of Korea

[21] Appl. No.: 08/851,139

[22] Filed: May 5, 1997

[30] Foreign Application Priority Data

May 3, 1996 [KR] Rep. of Korea .................. 96-14411
May 3, 1996 [KR] Rep. of Korea .................. 96-14425

[51] Int. Cl.⁶ .................................................. H04N 7/025
[52] U.S. Cl. ..................................... 348/465; 348/467
[58] Field of Search ............................ 348/465, 467, 348/468, 473, 478, 476, 563, 564, 569

[56] References Cited

U.S. PATENT DOCUMENTS

| | | | |
|---|---|---|---|
| 5,283,647 | 2/1994 | Seo | 348/468 |
| 5,428,400 | 6/1995 | Landis et al. | 348/465 |
| 5,486,865 | 1/1996 | James | 348/468 |
| 5,519,780 | 5/1996 | Woo et al. | 348/468 |
| 5,521,645 | 5/1996 | Ezaki | 348/465 |
| 5,570,134 | 10/1996 | Hong | 348/467 |
| 5,870,084 | 2/1999 | Kanungo et al. | 348/468 |

*Primary Examiner*—Victor R. Kostak
*Attorney, Agent, or Firm*—Staas & Halsey

[57] ABSTRACT

A closed-caption broadcasting and receiving method and apparatus. According to the closed-caption broadcasting method and apparatus, first and second language character information and control information are inputted, and control codes of 2 words and character codes of 2 words including a syllable character completion type code are produced. The control codes are obtained by combining the control information with a mode control bit and a parity bit, and the character codes are obtained by combining the first and second language character information with a mode control bit and a parity bit, respectively. First and second digital-modulated caption signals are produced by inputting the control codes and the character codes, respectively. The first or second caption signal is selected if the present field is discriminated as an odd or even field, respectively, and the selected caption signal is encoded in a scanning line which does not affect a television video signal to be transmitted in the air.

32 Claims, 35 Drawing Sheets

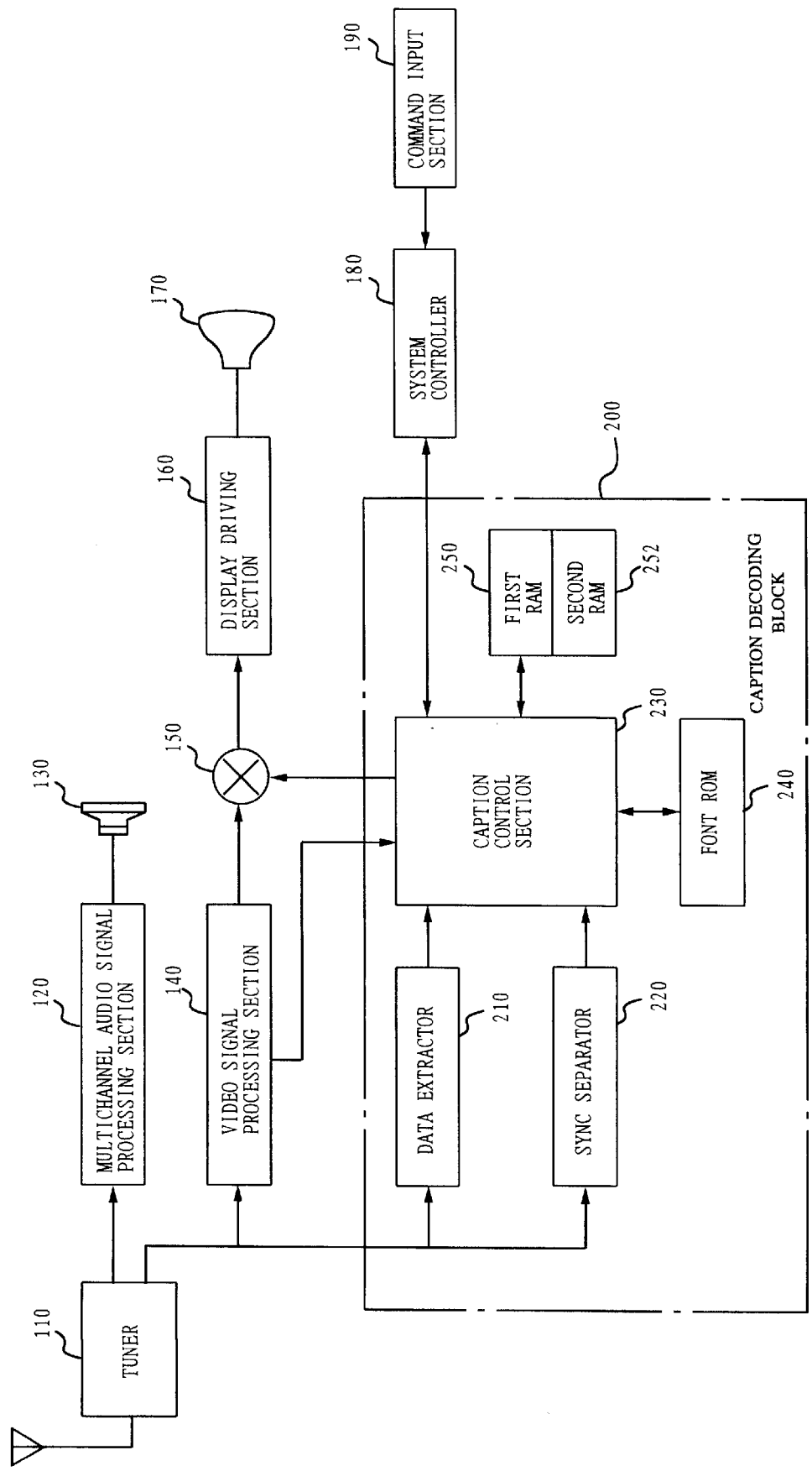

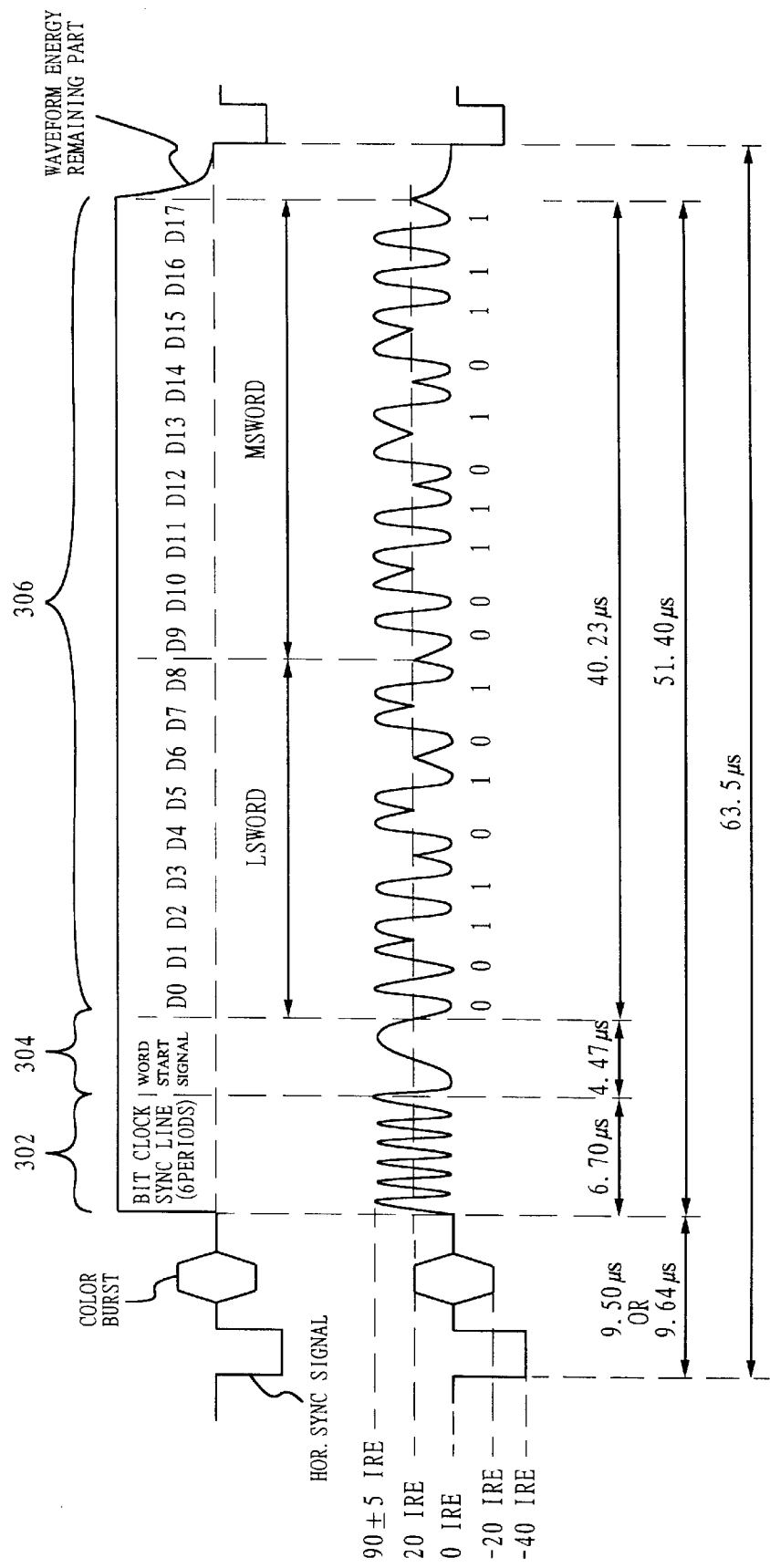

FIG. 5

| VALUES OF D3, D2, D1, IN LSWORD | VALUES OF D12, D11, D10, D9 IN MSWORD | | | | | | | | | | | | | | | | FUNCTION |
|---|---|---|---|---|---|---|---|---|---|---|---|---|---|---|---|---|---|
| | | 0 | 1 | 2 | 3 | 4 | 5 | 6 | 7 | 8 | 9 | A | B | C | D | E | F | |
| 0 | | black LTR | RED LTR | MAGENTA LTR | BLUE LTR | CYAN LTR | GREEN LTR | YELLOW LTR | WHITE LTR | BLACK GROUND | TRANSPARENT GROUND | MAGENTA GROUND | BLUE GROUND | CYAN GROUND | GREEN GROUND | YELLOW GROUND | WHITE GROUND | COLOR DESIG. |
| 1 | | ATTR. RELEASE | | | UNDER LINE DESIG. | | BLINK'G DESIG. | IMAGE DESIG. | | | 2-LINE ROLL-UP (PAGE START) | 3-LINE ROLL-UP | | 4-LINE ROLL-UP | | | 5-LINE ROLL-UP | CHAR. ATTR. & ROLL-UP |
| 2 | | ON-DISPLAY | | | OFF-DISPLAY | | HOR. WRIT'G | VER. WRIT'G | | | 2-LINE ROLL-DOWN (PAGE END) | 3-LINE ROLL-DOWN | | 4-LINE ROLL-DOWN | | | 5-LINE ROLL-DOWN | DISPLAY METHOD & ROLL-DOWN |
| 3 | | APDR | | | APUR | | APF | APB | | | 3LTR APF | 4LTR APF | | 5LTR APF | | | 6LTR APF | POSITION MOVEMENT |
| 4 | | 1ST ROW | | | 2ND ROW | | 3RD ROW | 4TH ROW | | | 5TH ROW | 6TH ROW | | 7TH ROW | | | 8TH ROW | ROW & COLUMN POSITION DESIG. |
| 5 | | 9TH ROW | | | 10TH ROW | | 1ST COL. | 2ND COL. | | | 3RD COL. | 4TH COL. | | 5TH COL. | | | 6TH COL. | |
| 6 | | 7TH ROW | | | 8TH COL. | | 9TH COL. | 10TH COL. | | | 11TH COL. | 12TH COL. | | 13TH COL. | | | 14TH COL. | |
| 7 | | 15TH ROW | | | 16TH COL. | | 17TH COL. | 18TH COL. | | | RECEIVE & STORE | HOLD | | HOLD | | | HOLD | |

FIG. 6A

| UPPER | LOWER | CLASSIFICATION |
|---|---|---|
| a1<br>a2 | a0~ff | SPECIAL CHARACTER |
| a3 | ″ | NUMERAL & ENGLISH CHARACTER |
| a4 | ″ | HANGUL CHARACTER |
| a5 | ″ | GREEK |
| a6~a9 | ″ | SPECIAL CHARACTER |
| aa<br>ab | ″ | JAPANESE HIRAGANA/KATAKANA |
| ac | ″ | RUSSIAN |
| ad~af | ″ | NOT IN USE |
| b0~c9 | ″ | HANGUL |
| ca~fe | ″ | CHINESE CHARACTER |
| ff | ″ | NOT IN USE |

FIG. 6B

| UPPER | LOWER | 0 1 2 3 4 5 6 7 8 9 a b c d e f |
|---|---|---|
| a1 | a0 | ´ ° ‥ ‥ ¨ 〃 ‐ ― ‖ \ ~ ' ' |
| | b0 | " " 〔 〕 〈 〉 《 》 「 」 『 』 【 】 ± × |
| | c0 | ÷ ≠ ≤ ≥ ∞ ∴ ° ′ ″ ℃ Å ¢ £ ¥ ♂ ♀ |
| | d0 | ∠ ⊥ ⌒ ∂ ∇ ≡ ≒ § ※ ☆ ★ ○ ● ◎ ◇ ◆ |
| | e0 | □ ■ △ ▲ ▽ ▼ → ← ↑ ↓ ↔ = ≪ ≫ √ ∽ |
| | f0 | ∝ ∵ ∫ ∬ ∈ ∋ ⊆ ⊇ ⊂ ⊃ ∪ ∧ ∨ ¬ |
| a2 | a0 | ⇒ ⇔ ∀ ∃ ´ ~ ˇ ˘ ˝ ˚ ˙ ¸ ˛ ¡ ¿ |
| | b0 | ː ƒ Σ Π ¤ ℉ ‰ ◁ ◀ ▷ ▶ ♤ ♠ ♡ ♥ ♧ |
| | c0 | ♣ ⊙ ◈ ■ ◐ ◑ ▨ ▧ ▦ ▥ ▩ ■ ☎ ☏ |
| | d0 | ‥ ‥ ¶ † ‡ ↕ ↗ ↙ ↖ ↘ ♭ ♪ ♬ ㉿ ㈜ |
| | e0 | № ㏇ ™ ㏂ ㏘ ℡ |
| | f0 | |
| a3 | a0 | ! " # $ % & ' ( ) * + , - . / |
| | b0 | 0 1 2 3 4 5 6 7 8 9 : ; < = > ? |
| | c0 | @ A B C D E F G H I J K L M N O |
| | d0 | P Q R S T U V W X Y Z [ W ] ^ _ |
| | e0 | ` a b c d e f g h i j k l m n o |
| | f0 | p q r s t u v w x y z { \| } ~ |
| a4 | a0 | ㄱ ㄲ ㄳ ㄴ ㄵ ㄶ ㄷ ㄸ ㄹ ㄺ ㄻ ㄼ ㄽ ㄾ ㄿ ㅀ |
| | b0 | ㅁ ㅂ ㅃ ㅄ ㅅ ㅆ ㅇ ㅈ ㅉ ㅊ ㅋ ㅌ ㅍ ㅎ ㅏ |
| | c0 | ㅐ ㅑ ㅒ ㅓ ㅔ ㅕ ㅖ ㅗ ㅘ ㅙ ㅚ ㅛ ㅜ ㅝ ㅞ ㅟ |
| | d0 | ㅠ ㅡ ㅢ ㅣ ㅥ ㅦ ㅧ ㅨ ㅩ ㅪ ㅫ ㅬ ㅭ ㅮ ㅯ |
| | e0 | ㅰ ㅱ ㅲ ㅳ ㅴ ㅵ ㅶ ㅷ ㅸ ㅹ ㅺ ㅻ ㅼ ㅽ ㅾ |
| | f0 | ㆀ ㆁ ㆂ ㆃ ㆄ ㆅ ㆆ ㆇ ㆈ ㆉ ㆊ ㆋ ㆌ · ˙ |
| a5 | a0 | ⅰ ⅱ ⅲ ⅳ ⅴ ⅵ ⅶ ⅷ ⅸ ⅹ |
| | b0 | Ⅰ Ⅱ Ⅲ Ⅳ Ⅴ Ⅵ Ⅶ Ⅷ Ⅸ Ⅹ |
| | c0 | Α Β Γ Δ Ε Ζ Η Θ Ι Κ Λ Μ Ν Ξ Ο |
| | d0 | Π Ρ Σ Τ Υ Φ Χ Ψ Ω |
| | e0 | α β γ δ ε ζ η θ ι κ λ μ ν ξ ο |
| | f0 | π ρ σ τ υ φ χ ψ ω |

FIG. 6C

| UPPER | LOWER | 0 1 2 3 4 5 6 7 8 9 a b c d e f |
|---|---|---|
| a6 | a0<br>b0<br>c0<br>d0<br>e0<br>f0 | ─ │ ┌ ┐ ┘ └ ├ ┬ ┤ ┴ ┼ ━ ┃ ┏ ┓<br>┛ ┗ ┣ ┳ ┫ ┻ ╋ ┠ ┯ ┨ ┷ ┿ ┝ ┰ ┥<br>┸ ╂ ┒ ┑ ┚ ┙ ┖ ┕ ┎ ┍ ┞ ┟ ┡ ┢ ┦ ┧<br>┩ ┪ ┭ ┮ ┱ ┲ ┵ ┶ ┹ ┺ ┽ ┾ ╀ ╁ ╃ ╄<br>╅ ╆ ╇ ╈ ╉ ╊ |
| a7 | a0<br>b0<br>c0<br>d0<br>e0<br>f0 | ㎕ ㎖ ㎗ ℓ ㎘ ㏄ ㎣ ㎤ ㎥ ㎦ ㎙ ㎚ ㎛ ㎜ ㎝<br>㎞ ㎟ ㎠ ㎡ ㎢ ㏊ ㎍ ㎎ ㎏ ㏏ ㎈ ㎉ ㏈ ㎧ ㎨ ㎰<br>㎱ ㎲ ㎳ ㎴ ㎵ ㎶ ㎷ ㎸ ㎹ ㎀ ㎁ ㎂ ㎃ ㎄ ㎺ ㎻<br>㎼ ㎽ ㎾ ㎿ ㎐ ㎑ ㎒ ㎓ ㎔ Ω ㏀ ㏁ ㎊ ㎋ ㎌ ㏖<br>㏅ ㎭ ㎮ ㎯ ㏛ ㎩ ㎪ ㎫ ㎬ ㏝ ㏐ ㏓ ㏃ ㏉ ㏜ ㏆ |
| a8 | a0<br>b0<br>c0<br>d0<br>e0<br>f0 |   Æ Ð ª Ħ   Ĳ   Ŀ Ł Ø Œ º Þ Ŧ ŋ<br>㉠ ㉡ ㉢ ㉣ ㉤ ㉥ ㉦ ㉧ ㉨ ㉩ ㉪ ㉫ ㉬ ㉭ ㉮<br>㉯ ㉰ 라 마 바 사 아 자 차 카 타 파 하 ⓐ ⓑ ⓒ<br>ⓓ ⓔ ⓕ ⓖ ⓗ ⓘ ⓙ ⓚ ⓛ ⓜ ⓝ ⓞ ⓟ ⓠ ⓡ ⓢ<br>ⓣ ⓤ ⓥ ⓦ ⓧ ⓨ ⓩ ① ② ③ ④ ⑤ ⑥ ⑦ ⑧ ⑨<br>⑩ ⑪ ⑫ ⑬ ⑭ ⑮ ½ ⅓ ⅔ ¼ ¾ ⅛ ⅜ ⅝ ⅞ |
| a9 | a0<br>b0<br>c0<br>d0<br>e0<br>f0 |   æ đ ð ħ ı ĳ ĸ ŀ ł ø œ ß þ ŧ ŋ<br>ŉ ㈀ ㈁ ㈂ ㈃ ㈄ ㈅ ㈆ ㈇ ㈈ ㈉ ㈊ ㈋ ㈌ ㈍ ㈎<br>㈏ ㈐ ㈑ ㈒ ㈓ ㈔ ㈕ ㈖ ㈗ ㈘ ㈙ ㈚ ㈛ ⒜ ⒝ ⒞<br>⒟ ⒠ ⒡ ⒢ ⒣ ⒤ ⒥ ⒦ ⒧ ⒨ ⒩ ⒪ ⒫ ⒬ ⒭ ⒮<br>⒯ ⒰ ⒱ ⒲ ⒳ ⒴ ⒵ ⑴ ⑵ ⑶ ⑷ ⑸ ⑹ ⑺ ⑻ ⑼<br>⑽ ⑾ ⑿ ⒀ ⒁ ⒂ ¹ ² ³ ⁴ ⁿ ₁ ₂ ₃ ₄ |
| aa | a0<br>b0<br>c0<br>d0<br>e0<br>f0 | ぁ あ ぃ い ぅ う ぇ え ぉ お か が き ぎ く<br>ぐ け げ こ ご さ ざ し じ す ず せ ぜ そ ぞ た<br>だ ち ぢ っ つ づ て で と ど な に ぬ ね の は<br>ば ぱ ひ び ぴ ふ ぶ ぷ へ べ ぺ ほ ぼ ぽ ま み<br>む め も ゃ や ゅ ゆ ょ よ ら り る れ ろ ゎ わ<br>ゐ ゑ を ん |

FIG. 6D

| UPPER | LOWER | 0 1 2 3 4 5 6 7 8 9 a b c d e f |
|---|---|---|
| ab | a0<br>b0<br>c0<br>d0<br>e0<br>f0 | ァアィイゥウェエォオカガキギク<br>グケゲコゴサザシジスズセゼソゾタ<br>ダチヂッツヅテデトドナニヌネノハ<br>バパヒビピフブプヘベペホボポマミ<br>ムメモャヤュユョヨラリルレロヮワ<br>ヰヱヲンヴヵヶ |
| ac | a0<br>b0<br>c0<br>d0<br>e0<br>f0 | А Б В Г Д Е Ё Ж З И Й К Л М Н<br>О П Р С Т У Ф Х Ц Ч Ш Щ Ъ Ы Ь Э<br>Ю Я<br>а б в г д е ё ж з и й к л м н<br>о п р с т у ф х ц ч ш щ ъ ы ь э<br>ю я |
| ad | a0<br>b0<br>c0<br>d0<br>e0<br>f0 | NOT IN USE |
| ae | a0<br>b0<br>c0<br>d0<br>e0<br>f0 | NOT IN USE |
| af | a0<br>b0<br>c0<br>d0<br>e0<br>f0 | NOT IN USE |

FIG. 6E

| UPPER | LOWER | 0 1 2 3 4 5 6 7 8 9 a b c d e f |
|---|---|---|
| b0 | a0 | 가각간갇갈갉갊감갑값갓갔강갖갗 |
| | b0 | 같갚갛개객갠갤갬갭갯갰갱갸갹갼걀 |
| | c0 | 걋걍개갠갤거걱건걷걸겁검겁것겄겅 |
| | d0 | 겆겉겊겋게겐겔겜겝겟겠겡겨격겪견 |
| | e0 | 걷결겸겹겻겼경곁계곈곌곕곗고곡곤 |
| | f0 | 곧골곪곬곯곰곱곳공곶과곽관괄괆 |
| b1 | a0 | 괌괍괏광괘괜괠괩괬괭괴괵괸괼굄 |
| | b0 | 굅굇굉교굔굘굡굣구국군굳굴굵굶 |
| | c0 | 굻굼굽굿궁궂궈궉권궐궜궝궤궷귀긴 |
| | d0 | 귈귐귑귓규균귤그극근귿글긁금급긋 |
| | e0 | 긍긔기긱긴긷길긺김깁깃깅깆깊까깍 |
| | f0 | 깎깐깔깖깜깝깟깠깡깥깨깩깬깰깸 |
| b2 | a0 | 깹깻깼깽꺄꺅꺌꺼꺽꺾껀껄껌껍껏 |
| | b0 | 껐껑께껙껜껨껫껭껴껸껼꼇꼈꼍꼐꼬 |
| | c0 | 꼭꼰꼲꼴꼼꼽꼿꽁꽂꽃꽈꽉꽐꽜꽝꽤 |
| | d0 | 꽥꽹꾀꾄꾈꾐꾑꾕꾜꾸꾹꾼꿀꿇꿈꿉 |
| | e0 | 꿋꿍꿎꿔꿜꿨꿩꿰꿱꿴꿸뀀뀁뀄뀌뀐 |
| | f0 | 뀔뀜뀝뀨끄끅끈끊끌끎끓끔끕끗끙 |
| b3 | a0 | 끝끼끽낀낄낌낍낏낑나낙낚난낟날 |
| | b0 | 낡낢남납낫났낭낮낯낱낳내낵낸낼냄 |
| | c0 | 냅냇냈냉냐냑냔냘냠냥너넉넋넌널넒 |
| | d0 | 넓넘넙넛넜넝넣네넥넨넬넴넵넷넸넹 |
| | e0 | 녀녁년녈념녑녔녕녘녜녠노녹논놀놂 |
| | f0 | 놈놉놋농높놓놔놘놜놨뇌뇐뇔뇜뇝 |
| b4 | a0 | 뇟뇨뇩뇬뇰뇹뇻뇽누눅눈눋눌눔눕 |
| | b0 | 눗눙눠눴눼뉘뉜뉠뉨뉩뉴뉵뉼늄늅늉 |
| | c0 | 느늑는늘늙늚늠늡늣능늦늪늬늰늴니 |
| | d0 | 닉닌닐닒님닙닛닝닢다닥닦단닫달닭 |
| | e0 | 닮닯닳담답닷닸당닺닻닿대댁댄댈댐 |
| | f0 | 댑댓댔댕댜더덕덖던덛덜덞덟덤덥 |

FIG. 6F

| UPPER | LOWER | 0 1 2 3 4 5 6 7 8 9 a b c d e f |
|---|---|---|
| b5 | a0 | 덧덩덫덮대덱덴델뎀뎁뎃뎄뎅더던 |
| | b0 | 덜덞덟데덴도독돈돌돏돐돔돕돗동 |
| | c0 | 돛돝돠돤돨돼됐되된될됨됩됫됴두둑 |
| | d0 | 둔둘둠둡둣둥뒤뒈뒝뒤뒨뒬뒴뒵뒷닝 |
| | e0 | 듀듄듈듐듕드득든듣들듧듬듭듯등듸 |
| | f0 | 디딕딘딛딜딤딥딧딨딩딪따딱딴딸 |
| b6 | a0 | 땀땁땃땄땅땋때땍땐땔땜땝땟땠땡 |
| | b0 | 떠떡떤떨떪떫떰떱떳떴떵떻떼떽뗀뗄 |
| | c0 | 뗌뗍뗏뗐뗑뗘뗬또똑똔똘똥똬똴뙈뙤 |
| | d0 | 뙨뚜뚝뚠뚤뚫뚬뚱뛔뛰뛴뛸뜀뜁뜅뜨 |
| | e0 | 뜩뜬뜯뜰뜸뜹뜻띄띈띌띔띕띠띤띨띰 |
| | f0 | 띱띳띵라락란랄람랍랏랐랑랒랖랗 |
| b7 | a0 | 래랙랜랠램랩랫랬랭랴략랸랼럇량러 |
| | b0 | 럭런럴럼럽럿렀렁렇레렉렌렐렘렙렛 |
| | c0 | 렝려력련렬렴렵렷렸령례롄롑롓로록 |
| | d0 | 론롤롬롭롯롱롸롼룃뢍뢨뢰뢴룀룁룃 |
| | e0 | 룅료룐룔룝룟룡루룩룬룰룸룹룻룽뤄 |
| | f0 | 뤘뤠뤼뤽륀륄륌륏륑류륙륜률륨륩 |
| b8 | a0 | 륫륭르륵른른름릅릇릉릊릍릎리릭 |
| | b0 | 린릴림립릿링마막만많맏말맑맒맘맙 |
| | c0 | 맛망맞맡맣매맥맨맬맴맵맷맸맹맺먀 |
| | d0 | 먁먈먕머먹먼멀멂멈멉멋멍멎멓메백 |
| | e0 | 멘멜멤멥멧멨멩며멱면멸몃몄명몇몌 |
| | f0 | 모목몫몬몰몲몸몹못몽뫄뫈뫘뫙뫼 |
| b9 | a0 | 묀묄묍묏묑묘묜묠묩묫무묵묶문묻 |
| | b0 | 물묽묾뭄뭅뭇뭉뭍뭏뭐뭔뭘뭡뭣뭬뮈 |
| | c0 | 뮌뮐뮤뮨뮬뮴뮷므믄믈믐믓미믹민믿 |
| | d0 | 밀밂밈밉밋밌밍및밑바박밖밗반받발 |
| | e0 | 밝밞밟밤밥밧방밭배백밴밸뱀뱁뱃뱄 |
| | f0 | 뱅뱉뱌뱍뱐뱝버벅번벋벌벎범법벗 |

FIG. 6G

| UPPER | LOWER | 0 1 2 3 4 5 6 7 8 9 a b c d e f |
|---|---|---|
| ba | a0 | 빙빛배백밴밸밷뱀밥뱃뱄뱅버벅번 |
|  | b0 | 벌범벗벘병벝베벤보복볶본볼봄봅봇 |
|  | c0 | 봉봐봔봤뵈뵀뵈복뵌뵐뵘뵙뵤본부복 |
|  | d0 | 분붇불붉붊붐붑붓붕붙붚붜붤붰붸뷔 |
|  | e0 | 뷕뷘뷜븽뷰뷴븀븁븟붕브븍븐블븜븝 |
|  | f0 | 븟비빅빈빌빍빎빔빕빗빙빛빝빠빡빤 |
| bb | a0 | 뺄빪빰빱빳빴빵뺘뺙뺀뺄뺌뺍뺏 |
|  | b0 | 뺐뺑빠빡빰뻬뻑뻔뻗뻘뻠뻣뻤뻥뻬뻿 |
|  | c0 | 뻐뻑뻠뻡뻣뻤뻥뽀뽁뽄뽈뽐뽑뽕뾔 |
|  | d0 | 뿅뿌뿍뿐뿔뿜뿟뿡뷰뿅쁘쁜쁠쁨쁩뻬 |
|  | e0 | 쁙삔삘삠삡삣삥사삭삯산산살삵삶삼 |
|  | f0 | 삽삿샀상샅새색샌샐샘샙샛샜생샤 |
| bc | a0 | 샥샨샬샴샵샷샹섀섄섈셈생서석섞 |
|  | b0 | 섟선섣설섦섧섬섭섯섰성섶세섹센셀 |
|  | c0 | 솀솁솃솄솅서석선설섬섭섯섰성세센 |
|  | d0 | 셀솅소속솎손솔솖솜솝솟송솥쇠쇡솬 |
|  | e0 | 쇨쇵쇄쇈쇨쇰쇳쇴쇠쇤쇨쇰쇳쇼속 |
|  | f0 | 손솔솜솝솟송수숙순숟술숨숩숫숭 |
| bd | a0 | 숯술숲쉐쉤쉐쉑쉔쉘쉠쉥쉬쉭쉰쉴 |
|  | b0 | 쉼쉽쉿슁슈숙슐슘슛슝스슥슨슬슭슴 |
|  | c0 | 습숫승시식신싣실싫심십싯싱싶싸싹 |
|  | d0 | 썼싼쌀쌈쌉쌌쌍쌓쌔쌕쌘쌜쌤쌥쌨쌩 |
|  | e0 | 썅써썩썬썰썲썸썹썼썽쎄쎈쎌쎈소속 |
|  | f0 | 쏜쏟쏠쏢쏨쏩쏭쐬쐭쐰쐈쐐쐤쐬쐰 |
| be | a0 | 쐴쐼쐽쑈쑤쑥쑨쑬쑴쑵쑹쒀쒔쒜쒸 |
|  | b0 | 쒼쓩쓰쏙쏜쓸씖씀씁씃씐쒤썸씨씩 |
|  | c0 | 씬씰썸씹씻씽아악안앉않알앍앎암 |
|  | d0 | 압앗았앙앝앞애액앤앨앰앱앳앴앵야 |
|  | e0 | 약얀얄얇얌얍얏양얕얗애얜얠얩어억 |
|  | f0 | 언얹얻얼얽얾엄업없엇었엉엊엌엎 |

FIG. 6H

| UPPER | LOWER | 0 1 2 3 4 5 6 7 8 9 a b c d e f |
|---|---|---|
| bf | a0 | 에엑엔엘엠엡엣엥어억워언얼읽없 |
|  | b0 | 엄업없엇였영옅옆엫에엔엘엠엡엣엤 |
|  | c0 | 오옥온올옭옮옰옳옴옵옷옹옻와왁완 |
|  | d0 | 왈왐왑왓왔왕왜왝왠왬왯왱외왹왼윌 |
|  | e0 | 윔윕윗윙요욕욘욜욤욥욧용우욱운울 |
|  | f0 | 욹욺움웁웃웅워웍원월웜웝웠웡웨 |
| c0 | a0 | 웩웬웰웸웹웽위윅윈윌윔윕윗윙유 |
|  | b0 | 육윤율윰융윷용윶으옥온을읊음읍읏 |
|  | c0 | 응읒읓읔읕읖읗의읜윌윔읫이익인일 |
|  | d0 | 읽읾잃임입잇있잉잊잎자작잔잖잗질 |
|  | e0 | 잚잠잡잣잤장잦재잭잰잴잼잽잿쟀쟁 |
|  | f0 | 쟈쟉쟌쟎쟐쟘쟝쟤쟨쟬저적전절젊 |
| c1 | a0 | 점접젓정젖제젝젠젤젬젭젯젱져젼 |
|  | b0 | 졀졈졉졌졍졔조족존졸졺좀좁좃종좆 |
|  | c0 | 좇좋좌좍좔좝좟좡좨좼좽죄죈죌죔쥐 |
|  | d0 | 죗죙죠족죤종주죽준줄줅줆줌줍줏숭 |
|  | e0 | 줘줬줴쥐쥑쥔쥘쥠쥡쥣쥬쥰슐슘즈즉 |
|  | f0 | 즌줄즘즙즛중지직진짇질짋짐집짓 |
| c2 | a0 | 징짖짙짚짜작짠짢짤짧잠잡잣짰쩡 |
|  | b0 | 째짹짼쨀쨈쨉쨋쨌쨍쟈쨘쨩쩌쩍쩐쩔 |
|  | c0 | 쩜쩝쩟쩠쩡쩨쩽쩌쩠쪼쪽쫀쫄쫌쫍쫏 |
|  | d0 | 쫑쫓좌쫙쫠좠쫴쬈죄쬔쬘쬠쬡중쭈쭉 |
|  | e0 | 쭌쭐쭘쭙중쒜쒔쮕쮜쮸쯔쯤쯧쯩찌찍 |
|  | f0 | 찐찔찜찝찡찢찧차착찬찮찰참찹찻 |
| c3 | a0 | 찼창찾채책챈챌챔챕챗챘챙챠챤챰 |
|  | b0 | 찰참창치척천철첨첩첫첬청체첵첸쳅 |
|  | c0 | 쳇쳉쳐쳔쳤쳬쳰촁초촉촌촐촘촙촛추 |
|  | d0 | 춓충촤촨촬촹최쵠쵤쵬쵭쵯쵱쵸추 |
|  | e0 | 축춘출춤춥춧충춰췄췌취췬췰췸췹 |
|  | f0 | 췻췽츄츈출츔충츠측츤츨츰츱츳층 |

FIG. 61

| UPPER | LOWER | 0 1 2 3 4 5 6 7 8 9 a b c d e f |
|---|---|---|
| c4 | a0 | 치 칙 친 친 칠 칡 침 침 칩 칫 칭 카 칵 칸 칼 캄 |
| | b0 | 캅 캇 캉 캐 캑 캔 캘 캠 캡 캣 캤 캥 캬 캭 컁 커 |
| | c0 | 걱 컨 컫 컬 컴 컵 컷 컸 컹 케 켁 켄 켈 켐 켑 켓 |
| | d0 | 켕 켜 켠 켤 켬 켭 켯 켰 켱 켸 코 콕 콘 콜 콤 콥 |
| | e0 | 콧 콩 콰 콱 콴 콸 쾀 쾅 쾌 쾡 쾨 쾰 쿄 쿠 쿡 쿤 |
| | f0 | 쿨 쿰 쿱 쿳 쿵 쿼 퀀 퀄 퀑 퀘 퀭 퀴 퀵 퀸 퀼 |
| c5 | a0 | 큄 큅 큇 큉 큐 큔 큘 큠 크 큭 큰 클 큼 큽 킁 |
| | b0 | 키 킥 킨 킬 킴 킵 킷 킹 타 탁 탄 탈 탉 탐 탑 탓 |
| | c0 | 탔 탕 태 택 탠 탤 탬 탭 탯 탰 탱 탸 턍 터 턱 턴 |
| | d0 | 털 턺 텀 텁 텃 텄 텅 테 텍 텐 텔 템 텝 텟 텡 텨 |
| | e0 | 텬 텼 톄 톈 토 톡 톤 톨 톰 톱 톳 통 톹 퇴 퇀 퇘 |
| | f0 | 퇴 된 툇 툉 툐 투 툭 툰 툴 툼 툽 툿 퉁 퉈 퉜 |
| c6 | a0 | 퉤 튀 튁 튄 튈 튐 튑 튕 튜 튠 튤 튬 튱 트 특 |
| | b0 | 튼 튿 틀 틂 틈 틉 틋 틔 틘 틜 틤 틤 티 틱 틴 틸 |
| | c0 | 팀 팁 팃 팅 파 팍 팎 판 팔 팖 팜 팝 팟 팠 팡 팥 |
| | d0 | 패 팩 팬 팰 팸 팹 팻 팼 팽 퍄 퍅 퍼 퍽 펀 펄 펌 |
| | e0 | 펍 펏 펐 펑 페 펙 펜 펠 펨 펩 펫 펭 펴 편 펼 폄 |
| | f0 | 폅 폈 평 폐 폘 폡 폣 포 폭 폰 폴 폼 폽 폿 퐁 |
| c7 | a0 | 퐈 퐝 푀 푄 표 푠 푤 푯 푸 푹 푼 푿 풀 품 |
| | b0 | 품 풉 풋 풍 풔 풩 퓌 퓐 퓔 퓜 퓟 퓨 퓬 퓰 퓸 퓻 |
| | c0 | 퓽 프 픈 플 픔 픕 픗 피 픽 핀 필 핌 핍 핏 핑 하 |
| | d0 | 학 한 할 핥 함 합 핫 항 해 핵 핸 핼 햄 햅 햇 했 |
| | e0 | 행 햐 향 허 헉 헌 헐 헒 험 헙 헛 헝 헤 헥 헨 헬 |
| | f0 | 헴 헵 헷 헹 혀 혁 현 혈 혐 협 혓 혔 형 혜 혠 |
| c8 | a0 | 혤 혭 호 혹 혼 홀 홅 홈 홉 홋 홍 홑 화 확 환 |
| | b0 | 활 홧 황 홰 홱 홴 횃 횅 회 획 횐 횔 횝 횟 횡 효 |
| | c0 | 횬 횰 횹 횻 후 훅 훈 훌 훑 훔 훗 훙 훠 훤 훨 훰 |
| | d0 | 훵 훼 훽 휀 휄 휑 휘 휙 휜 휠 휨 휩 휫 휭 휴 휵 |
| | e0 | 휸 휼 흄 흇 흉 흐 흑 흔 흖 흗 흘 흙 흠 흡 흣 흥 |
| | f0 | 흩 희 흰 흴 흼 흽 힁 히 힉 힌 힐 힘 힙 힛 힝 |

FIG. 6J

| UPPER | LOWER | 0 1 2 3 4 5 6 7 8 9 a b c d e f |
|---|---|---|
| c9 | a0<br>b0<br>c0<br>d0<br>e0<br>f0 | USER'S<br>DEFINITION REGION<br>FOR HANGUL |
| ca | a0<br>b0<br>c0<br>d0<br>e0<br>f0 | 伽佳假價加可呵哥嘉嫁家暇架枷柯<br>歌珂痂稼苛茄街袈訶賈跏軻迦駕刻却<br>各恪愨殼珏脚覺角閣侃刊墾奸干幹<br>懇揀杆束桿澗癎看磵稈竿簡肝艮諫<br>間乫喝曷渴碣竭葛褐蝎褐勘坎堪嵌感<br>憾戡敢柑橄減甘疳監瞰紺邯鑑鑒龕 |
| cb | a0<br>b0<br>c0<br>d0<br>e0<br>f0 | 匣岬甲胛鉀閘剛堈姜岡崗康强彊慷<br>江畺疆糠絳綱羌腔舡茳蔃講鋼降鱇介<br>价個凱塏愷愾概改槪溉疥皆盖箇芥蓋<br>豈鎧開喀客坑更粳羹醵居去居巨拒据<br>據擧渠炬祛距踞車遽鉅鋸乾件健巾建<br>愆楗腱虔蹇鍵騫乞傑杰桀儉劍劒檢 |
| cc | a0<br>b0<br>c0<br>d0<br>e0<br>f0 | 瞼鈐黔劫怯法偈憩揭擊格檄激膈覡<br>隔堅牽犬甄絹縳肩見譴遣鵑抉決潔結<br>缺訣兼慊箝謙鉗鎌京俓倞傾儆勁勍卿<br>坰境庚徑慶憬擎敬景暻更梗涇炅烱璟<br>璥瓊痙硬磬竟競綱經耕耿脛莖警輕逕<br>鏡頃頸驚鯨係啓堺契季屆悸戒桂械 |
| cd | a0<br>b0<br>c0<br>d0<br>e0<br>f0 | 棨溪界癸磎稽系繫繼計誡谿階鷄古<br>叩告呱固姑孤尻庫拷攷故敲暠枯槁沽<br>痼皐睾稿羔考股膏苦菰菇藁蠱袴誥賈<br>辜錮雇顧高敲哭斛曲梏穀谷鵠困坤崑<br>昆梱棍滾琨袞鯤汨滑骨供公共功孔工<br>恐恭拱控攻珙空蚣貢鞏串寡戈果瓜 |

FIG. 6K

| UPPER | LOWER | 1 2 3 4 5 6 7 8 9 a b c d e f |
|---|---|---|
| ce | a0 | 科菓誇課跨過鍋顆廓槨薔郭串冠官 |
|  | b0 | 寬慣棺款灌琯瓘管罐筶觀貫關館刮恝 |
|  | c0 | 括适侊光匡壙廣曠洸侊狂珖筐胱鑛卦 |
|  | d0 | 掛罫乖傀塊壞怪愧拐槐魁宏紘肱轟交 |
|  | e0 | 僑咬喬嬌嶠巧攪敎校橋狡皎矯紋翹膠 |
|  | f0 | 蕎蛟較轎郊餃驕鮫丘久九仇俱具勾 |
| cf | a0 | 區口句咎嘔坵垢寇嶇廐懼拘救枸柩 |
|  | b0 | 構歐毆毬求溝灸狗玖球瞿矩究絿耉臼 |
|  | c0 | 舅舊苟衢謳購軀述邱鈎銶駒驅鳩鷗龜 |
|  | d0 | 國局菊鞠鞫麴君窘群裙軍郡堀屈掘窟 |
|  | e0 | 宮弓穹窮芎躬倦券勸卷圈拳捲權淃眷 |
|  | f0 | 厥獗蕨蹶闕机櫃潰詭軌饋句噐歸貴 |
| d0 | a0 | 鬼龜叫圭奎揆槻珪硅窺竅糾葵規赳 |
|  | b0 | 逵閨匀均畇筠菌鈞龜橘克剋劇較棘亟 |
|  | c0 | 隙僅劤勤懃斤根槿瑾筋芹菫覲謹近饉 |
|  | d0 | 契今妗擒吟檎琴禁禽芩衾衿襟金錦伋 |
|  | e0 | 及急扱汲級給亘兢矜肯企伎其冀嗜器 |
|  | f0 | 圻基埼夔奇妓寄岐崎己幾忌技旗旣 |
| d1 | a0 | 芽期杞棋棄機欺氣汽沂淇玘琦琪璂 |
|  | b0 | 璣畸畿碁磯祁祇祈祺箕紀綺羈耆肌 |
|  | c0 | 記譏豈起錡錤飢饑騎騏驥麒緊佶吉拮 |
|  | d0 | 桔金喫儺喇奈娜懦拏拿儺羅蘿螺裸 |
|  | e0 | 邏那樂洛烙珞落諾酪駱亂卵暖欄煖爛 |
|  | f0 | 蘭難鸞捏捺南嵐枏楠湳濫男籃舊拉 |
| d2 | a0 | 納臘蠟衲囊娘廊朗浪狼郎乃來內奈 |
|  | b0 | 柰耐冷女年撚秊念恬拈捻寧寗努勞奴 |
|  | c0 | 弩怒擄櫓爐瑙盧老蘆虜路露駑魯鷺碌 |
|  | d0 | 祿綠菉錄鹿論壟弄濃籠聾膿農惱牢磊 |
|  | e0 | 腦賂雷尿壘屢樓淚漏累縷陋嫩訥紐鈕 |
|  | f0 | 勒肋凜凌稜綾能菱陵尼泥匿溺多茶 |

FIG. 6L

| UPPER | LOWER | 0 1 2 3 4 5 6 7 8 9 a b c d e f |
|---|---|---|
| d3 | a0 | 丹亶但單團壇象斷旦檀段湍短端簞 |
| | b0 | 緞蛋袒鄲鍛撻澾獺疸達畓坍憺擔曇淡 |
| | c0 | 湛潭澹痰聃膽蕁覃談錟沓畓答踏遝 |
| | d0 | 唐堂塘幢戇撞棠當糖螳黨代垈岱大對 |
| | e0 | 岱帶待戴擡玳臺袋貸隊黛宅德悳倒刀 |
| | f0 | 到圖堵塗導屠島嶋度徒悼挑掉搗桃 |
| d4 | a0 | 棹櫂淘渡滔濤燾盜睹禱稻萄覩賭跳 |
| | b0 | 蹈逃途道都鍍陶韜毒瀆牘犢獨督禿篤 |
| | c0 | 纛讀墩惇敦旽暾沌焞燉豚頓乭突全冬 |
| | d0 | 凍動同憧東桐棟洞潼疼瞳童胴董銅兜 |
| | e0 | 斗杜枓痘竇荳讀豆逗頭屯臀芚遁遯鈍 |
| | f0 | 得嶝橙燈登等藤謄鄧騰喇懶拏懶羅 |
| d5 | a0 | 蘿螺裸邏樂洛烙珞絡落諾酪駱丹亂 |
| | b0 | 卵欄煖瀾爛蘭鸞剌辣嵐擥攬欖灠籃纜 |
| | c0 | 藍襤拉臘蠟廊朗浪狼琅瑯螂郞來崍 |
| | d0 | 徠萊冷掠略亮倆兩凉梁樑粮梁糧良諒 |
| | e0 | 輛量侶儷勵呂廬慮戾旅櫚濾礪藜蠣閭 |
| | f0 | 驢驪麗黎力曆歷瀝礫轢靂憐戀攣漣 |
| d6 | a0 | 煉璉練聯蓮輦連鍊列劣洌烈裂廉 |
| | b0 | 斂殮濂簾獵令伶囹寧岺嶺怜玲笭翎 |
| | c0 | 聆逞鈴零齡領例澧禮醴隷勞怒撈擄 |
| | d0 | 櫓潞瀘爐盧老蘆虜路輅露魯鷺鹵碌祿 |
| | e0 | 綠菉錄鹿麓論壟弄朧瀧瓏籠聾儡瀨牢 |
| | f0 | 磊賂賚賴雷了僚寮廖料燎療瞭聊蓼 |
| d7 | a0 | 遼閙龍壘婁屢樓淚漏瘻累縷蔞褸鏤 |
| | b0 | 陋劉旒柳榴流溜瀏琉瑠留瘤硫謬類六 |
| | c0 | 戮陸侖倫崙淪綸輪律慄栗率隆勒肋凜 |
| | d0 | 凌楞稜綾菱陵俚利厘吏唎履悧李梨浬 |
| | e0 | 犁狸理璃異痢籬罹羸莉裏裡釐離鯉 |
| | f0 | 吝潾燐璘藺躪隣鱗麟林淋琳臨霖砬 |

FIG. 6M

| UPPER | LOWER | 0 1 2 3 4 5 6 7 8 9 a b c d e f |
|---|---|---|
| d8 | a0 | 立笠粒摩瑪瓶碼磨馬魔麻寬幕漢膜 |
|  | b0 | 莫邈万卍娩樊彎慢挽晚曼滿漫灣瞞萬 |
|  | c0 | 蔓蠻輓饅鰻惷抹末沫茉襪靺亡妄忘忙 |
|  | d0 | 望網罔芒茫莽輞邙埋妹媒寐昧枚梅每 |
|  | e0 | 煤罵買賣邁魅脈貊陌驀麥孟氓猛盲盟 |
|  | f0 | 萌冪覓免冕勉棉沔眄眠綿緬面麵滅 |
| d9 | a0 | 蔑冥名命明暝椧溟皿瞑茗蓂酪銘 |
|  | b0 | 鳴袂侮冒唪姆帽慕摸摹暮某模母毛牟 |
|  | c0 | 牡瑁眸矛耗芼茅謀謨貌木沐牧目睦穆 |
|  | d0 | 鶩歿沒夢朦蒙卯墓妙廟描昴杳渺猫竗 |
|  | e0 | 苗錨務巫憮懋戊拇撫无楙武毋無珷畝 |
|  | f0 | 繆舞茂蕪誣貿霧鵡墨默們勿吻問文 |
| da | a0 | 汶紊紋聞蚊門雯勿汤物味媚尾嵋彌 |
|  | b0 | 微未梶楣渼湄眉米美薇謎迷靡黴岷悶 |
|  | c0 | 愍憫敏旻旼民泯玟珉緡閔密蜜謐剝博 |
|  | d0 | 拍搏撲朴樸泊珀璞箔粕縛膊舶薄迫雹 |
|  | e0 | 駁伴半反叛拌搬攀斑槃泮潘班瘢盤盼 |
|  | f0 | 磐磻攀絆般蟠返頒飯勃拔撥渤潑 |
| db | a0 | 發跋醱鉢髮魃倣傍坊妨尨幇彷房放 |
|  | b0 | 方旁昉枋榜滂磅紡肪膀舫芳蒡蚌訪謗 |
|  | c0 | 邦防龐俳北培徘拜排杯湃焙盃背胚 |
|  | d0 | 裴裵褙賠輩配陪伯佰帛柏栢白百魄幡 |
|  | e0 | 樊煩燔番磻繁蕃藩飜伐筏罰閥凡帆梵 |
|  | f0 | 氾汎泛犯範范法琺僻劈壁擘檗璧癖 |
| dc | a0 | 碧蘗闢霹便卞弁變辨辯邊別瞥鱉鼈 |
|  | b0 | 丙倂兵屛幷昞柄棅炳瓶病秉竝輧餠 |
|  | c0 | 騈保堡報寶普步洑潽潸珤甫菩補褓譜 |
|  | d0 | 輔伏僕匐卜宓復服福腹茯蔔複覆輹輻 |
|  | e0 | 馥鰒本乶俸奉封峯峰捧棒烽熢琫縫蓬 |
|  | f0 | 蜂逢鋒鳳不付俯傅剖副否附埠夫婦 |

FIG. 6N

| UPPER | LOWER | 0 1 2 3 4 5 6 7 8 9 a b c d e f |
|---|---|---|
| dd | a0 | 孚孵富府復扶敷斧浮溥父符簿衍腐 |
|  | b0 | 腑膚艀芙莩訃負賦賻赴趺部釜阜附駙 |
|  | c0 | 鳧北分吩噴墳奔憤忿愼扮昐汾焚盆粉 |
|  | d0 | 糞紛芬賁雰不佛弗佛拂崩朋棚硼繃鵬 |
|  | e0 | 丕備匕匪卑妃婢庇悲憊扉批斐枇榧比 |
|  | f0 | 毖吡毘沸泌琵痺砒碑秕秘粃緋翡肥 |
| de | a0 | 脾臂菲蜚裨誹鄙非飛鼻嚬嬪彬 |
|  | b0 | 斌檳殯浜濱瀕牝玭貧賓頻憑氷聘騁乍 |
|  | c0 | 事些仕伺似使俟僿史司唆嗣四士奢娑 |
|  | d0 | 寫寺射巳師徙思捨斜斯柶査梭死沙泗 |
|  | e0 | 渣瀉獅砂社祀祠私篩紗絲肆舍莎蓑蛇 |
|  | f0 | 裟詐詞謝賜赦辭邪飼駟麝削數朔索 |
| df | a0 | 傘刪山散汕珊産疝算蒜酸霰乽撒殺 |
|  | b0 | 煞薩三參杉森渗芟蔘衫揷澁級颯上傷 |
|  | c0 | 像償商喪嘗孀尙峠常床庠廂想桑橡湘 |
|  | d0 | 爽牀狀相祥箱翔裳觴詳象賞霜孀塞 |
|  | e0 | 뜸塞穡索色牲生甥省笙墅壻嶼序庶徐 |
|  | f0 | 恕抒捿敍暑曙書栖棲犀瑞筮絮緒署 |
| e0 | a0 | 胥舒薯西誓逝鋤黍鼠夕奭席惜昔析 |
|  | b0 | 晳汐淅潟石碩蓆釋錫仙僊先善墡嬋宣扇 |
|  | c0 | 敾旋渲煽琔瑄璇璿癬禪線縇羨腺膳船 |
|  | d0 | 蘚蟬詵跣選銑鐥饍鮮嚙屑楔泄洩渫舌 |
|  | e0 | 薛褻設說雪屑刹暹殲纖蟾贍閃陝攝涉 |
|  | f0 | 燮葉城姓宬性惺成星晟猩珹盛省筬 |
| e1 | a0 | 聖聲腥誠醒世勢歲洗稅笹細說貰召 |
|  | b0 | 嘯塑宵小少巢所掃搔昭梳沼消溯瀟炤 |
|  | c0 | 燒甦疏疎瘙笑篠簫紹蔬蕭蘇訴逍遡 |
|  | d0 | 邵銷韶騷俗屬束涑粟續謖贖速屬捉 |
|  | e0 | 孫遜飡率宋悚松淞訟誦送頌刷殺灑碎 |
|  | f0 | 鎖衰釗修受嗽囚乖壽嫂守岫峀帥愁 |

FIG. 60

| UPPER | LOWER | 0 1 2 3 4 5 6 7 8 9 a b c d e f |
|---|---|---|
| e2 | a0 | 成手授搜收敷樹殊水洙漱燧狩獣珠 |
|  | b0 | 璲捜睡秀穂竪粋綏綬繍蓋修朱蒐荐藪 |
|  | c0 | 袖雛讐輸逐遂酬銖銹隋隧随雖需須首 |
|  | d0 | 髄鬚叔塾夙孰宿淑祝熟俶璹鬻菽巡徇 |
|  | e0 | 循恂旬枸楯槇殉洵淳珣盾瞬筍純脣舜 |
|  | f0 | 荀尊芻詢諄醇錞順聊戌術述鉥絮松 |
| e3 | a0 | 嵩瑟膝蝨濕拾習褶襲丞乘僧勝升承 |
|  | b0 | 昇縄蠅陞侍匙嘶始媤尸屎屍市弑恃施 |
|  | c0 | 是時柿柴猜矢示翅蒔蓍視試詩諡豕豺 |
|  | d0 | 埴寔式息拭植殖湜熄篒蝕識軾食飾伸 |
|  | e0 | 侁呻娠宸慎新晨燼申神紳腎臣莘薪 |
|  | f0 | 藎蜃訊身辛辰迅失室實悉審尋心沁 |
| e4 | a0 | 沈深瀋甚芯諶什十拾雙氏亞俄兒啞 |
|  | b0 | 娥峨我牙芽莪蛾衙訝阿雅餓鴉鵝堊岳 |
|  | c0 | 嶽幄惡愕握樂渥鄂鍔顎鰐安岸按晏 |
|  | d0 | 案眼雁鞍顔鮟斡謁軋閼唵岩嚴庵暗癌 |
|  | e0 | 菴闇壓押狎鴨仰央快昻殃秧鴦厓哀埃 |
|  | f0 | 崖愛曖涯碍艾隘靄厄扼掖液縊腋額 |
| e5 | a0 | 櫻罌鶯鸚也倻冶夜惹揶椰爺耶若野 |
|  | b0 | 弱掠略約若葯蒻藥躍亮佯兩凉壞孃恙 |
|  | c0 | 揚攘敭暘梁楊樣洋瀁煬痒瘍禳穰糧羊 |
|  | d0 | 良襄諒讓釀陽量養圄御於漁瘀瘀語馭 |
|  | e0 | 魚齬億憶抑檍臆堰彦焉蔫諺擘瓛俺 |
|  | f0 | 儼嚴奄掩淹業円予余勵呂女如廬 |
| e6 | a0 | 旅歟汝濾璵礖礪與艅茹輿譽閭餘驢 |
|  | b0 | 麗黎亦力域役易曆歷疫繹譯轢逆驛嚥 |
|  | c0 | 堧妍娟宴年延憐戀捐挺撚椽沇沿涎涓 |
|  | d0 | 淵演漣烟然煙棟燃筵瑌研硯季筵緣練 |
|  | e0 | 縯聯衍軟輦連鉛鍊憲列劣咽悅涅烈 |
|  | f0 | 熱裂說閱厭廉念捻染殮炎焰琰艶苒 |

FIG. 6P

| UPPER | LOWER | 0 1 2 3 4 5 6 7 8 9 a b c d e f |
|---|---|---|
| e7 | a0<br>b0<br>c0<br>d0<br>e0<br>f0 | 簾閭餮鹽曄獵燁葉令囹塋寧嶺嶸影<br>怜映暎橀榮永泳渶潁濚濾瀯煐營獰玲<br>瑛瑩瓔盈穎櫻羚聆英詠迎鍈鯎鴒獒嬶<br>領乂倪例刈叡曳汭濊猊睿穢芮藝蘂禮<br>裔詣譽豫醴銳隸霓預五伍俉傲午吾吳<br>嗚塢墺奧娛寤悟惡懊敖晤梧汚澳 |
| e8 | a0<br>b0<br>c0<br>d0<br>e0<br>f0 | 烏熬獒筽蜈誤繁鼇屋沃獄玉鈺溫瑥<br>瘟穩縕蘊兀壅擁甕甕癰翁邕雍雍渦瓦<br>窩窪臥蛙蝸訛婉完宛梡椀浣玩琓琬碗<br>緩翫脘腕莞豌阮頑曰往旺枉汪王倭娃<br>歪矮外巍猥畏了僚僥凹堯夭妖姚寮<br>寮尿嶢拗搖撓擾料曜樂橈燎燿瑤療 |
| e9 | a0<br>b0<br>c0<br>d0<br>e0<br>f0 | 窈窯繇繞耀腰蓼蟯要謠遙遼邀饒慾<br>欲浴縟褥辱俑傭冗勇埇墉容庸慂榕涌<br>湧溶熔瑢用甬聳茸蓉踊鎔鏞龍于佑偶<br>優又友右宇寓尤愚憂旴牛玗瑀盂祐禑<br>禹紆羽芋藕虞迂遇郵釪隅雨雩勖彧旭<br>昱栯煜稢郁項云霣櫄殞澐熉耘蕓芸 |
| ea | a0<br>b0<br>c0<br>d0<br>e0<br>f0 | 運隕蕓韻蔚鬱亏熊雄元原員圓園垣<br>媛嫄寃怨愿援沅洹湲源爰猿瑗苑袁轅<br>遠阮院願鴛月越鉞位偉僞危圍委威尉<br>慰暐渭爲瑋緯胃萎葦蔿蝟衛褘違韋<br>魏乳侑儒兪劉唯喩孺宥幼幽庾悠惟愈<br>愉揄攸有杻柔柚楢楡油洧流游溜 |
| eb | a0<br>b0<br>c0<br>d0<br>e0<br>f0 | 濡猶猷琉瑜由留癒硫紐維臾萸裕誘<br>諛諭踰蹂遊逾遺酉釉鍮類六堉戮毓肉<br>育陸倫允奫尹崙淪潤玩胤贇輪鈗閏律<br>慄栗率聿戎瀜絨融隆垠恩慇殷戭闇銀隱<br>乙吟淫蔭陰音飮揖泣邑凝應膺鷹依倚<br>儀宜意懿擬椅毅疑矣義艤薏蟻衣誼 |

FIG. 6Q

| UPPER | LOWER | 0 1 2 3 4 5 6 7 8 9 a b c d e f |
|---|---|---|
| ec | a0 | 護翳二以伊利吏夷姨履巳弛彝怡易 |
|  | b0 | 李梨泥爾珥理異痍痢移羅而耳肄苡蓷 |
|  | c0 | 翼裡咍貳邇里離飴俐匠溺溷益翊翌翼 |
|  | d0 | 證人仁刃印咨咽因姻寅引忍湮煙璘絪 |
|  | e0 | 茵咽蚓認隣靭靷鱗麟一佚佾壹日澄逸 |
|  | f0 | 鎰馹任壬妊姙恁林淋稔臨荏賃入什 |
| ed | a0 | 立笠粒仍剩孕芿仔剌杏姉姿子字孜 |
|  | b0 | 恣慈滋炙煮兹瓷疵磁紫者自茨蔗籍諸 |
|  | c0 | 資雌作勺嚼斫昨灼炸爵綽芍酌雀鵲勝 |
|  | d0 | 棧殘潺盞岑暫潛箴簪蠶雜丈仗匠場墻 |
|  | e0 | 壯奬將帳庄張掌暲杖樟檣檣漿牆狀獐 |
|  | f0 | 璋章粧腸臟藏莊葬蔣薔薕裝贓醬長 |
| ee | a0 | 障再哉在宰才材栽梓渽滓災縡裁財 |
|  | b0 | 賊齋齎爭箏諍錚佇低儲咀姐底抵杵楮 |
|  | c0 | 樗沮渚狙猪疽箸紵苧菹著藷詛貯躇這 |
|  | d0 | 邸雎齟勣吊嫡寂摘敵滴狄炙的積笛籍 |
|  | e0 | 績翟荻謫賊赤跡蹟迪迹適鏑佃佺傳全 |
|  | f0 | 典剪塡塚奠奐展廛悛戰栓殿氈澱 |
| ef | a0 | 煎琠田甸畑癲筌箋箭篆纏詮輾轉鈿 |
|  | b0 | 銓錢鐫電顚顫餞切截折浙癤竊節絶占 |
|  | c0 | 岾店漸点粘霑鮎點接摺蝶丁井亭停偵 |
|  | d0 | 呈姃定幀庭廷征情挺政整旌晶柾桯楨 |
|  | e0 | 檉正汀淀淨渟湞瀞炡玎珽町睛碇禎程 |
|  | f0 | 穽精艇訂諪貞鄭酊釘鉦鋌錠霆靖 |
| f0 | a0 | 靜頂鼎制劑啼堤帝弟悌提梯濟祭第 |
|  | b0 | 臍薺製諸蹄醍除際霽題齊俎兆凋助嘲 |
|  | c0 | 弔彫措操早晁曺朝條棗槽漕潮照燥 |
|  | d0 | 爪璪眺祖祚租稠窕粗糟繰藻蚤詔 |
|  | e0 | 調趙躁造遭釣阻雕鳥族簇足鏃存尊卒 |
|  | f0 | 拙猝倧宗從悰棕淙琮種終綜縱腫 |

FIG. 6R

| UPPER | LOWER | 0 1 2 3 4 5 6 7 8 9 a b c d e f |
|---|---|---|
| f1 | a0 | 踪踵鍾鐘佐坐左座挫罪主住侏做蛛 |
| | b0 | 冑呪周嗾奏宙州廚胄朱柱株注洲湊澍 |
| | c0 | 炷珠疇籌紂紬綢舟蛛註誅走躊輳週酎 |
| | d0 | 酒鑄駐竹粥俊儁准埈寯峻晙樽浚準濬 |
| | e0 | 焌畯竴蠢逡遵雋駿茁中仲衆卽櫛楫 |
| | f0 | 汁葺增憎曾拯烝甑症繒蒸證贈之只 |
| f2 | a0 | 咫地址志持指摯支旨智枝枳止池沚 |
| | b0 | 漬知砥祉祗紙肢脂至芝芷蜘誌識贄趾 |
| | c0 | 遲直稙稷織職唇嗔塵振搢晉晋桭榛殄 |
| | d0 | 津溱珍瑨璡畛疹盡眞瞋縉縝臻蓁袗 |
| | e0 | 診賑軫辰進鎭陣陳震侄叱姪嫉帙桎 |
| | f0 | 疾秩窒膣蛭質跌迭斟朕什執潗緝輯 |
| f3 | a0 | 鏶集徵懲澄且侘借叉嗟嵯差次此磋 |
| | b0 | 箚茶蹉車遮捉搾着窄錯鑿齪撰澯燦璨 |
| | c0 | 瓚竄簒粲纂纘讚贊鑽餐饌刹察擦札紮 |
| | d0 | 僭參塹慘慙懺斬站讒讖倉創唱娼廠 |
| | e0 | 彰愴敞昌昶暢槍滄漲猖瘡窓脹艙菖蒼 |
| | f0 | 債埰寀寨彩採砦綵菜蔡采釵冊柵策 |
| f4 | a0 | 責凄妻悽處倜刺剔尺慽戚拓擲斥滌 |
| | b0 | 瘠脊蹠陟隻仟千喘天川擅泉淺玔穿舛 |
| | c0 | 薦賤踐遷釧闡阡韆凸哲喆徹撤澈綴輟 |
| | d0 | 轍鐵僉尖沾添甛瞻簽籤詹諂堞妾帖捷 |
| | e0 | 牒疊睫諜貼輒廳晴淸聽菁請靑鯖切剔 |
| | f0 | 替涕滯締諦逮遞體初剿哨憔抄招梢 |
| f5 | a0 | 椒楚樵炒焦硝礁礎秒稍肖艸苕草蕉 |
| | b0 | 貂超酢醋醮促囑燭矗蜀觸寸忖村邨叢 |
| | c0 | 塚寵悤憁摠總聰蔥銃撮催崔寉嘬墜抽 |
| | d0 | 推椎楸湫皺秋芻萩諏趨追鄒酋醜錐錘 |
| | e0 | 鎚雛騶鰍丑畜祝竺筑築縮蓄蹙蹴軸逐 |
| | f0 | 春椿瑃出朮黜充忠沖蟲衝衷悴膵萃 |

FIG. 6S

| UPPER | LOWER | 0 1 2 3 4 5 6 7 8 9 a b c d e f |
|---|---|---|
| f6 | a0 | 贅取吹嘴娶就炊翠聚脆臭趣醉驟驚 |
| | b0 | 側仄胴惻測脣侈傯啁峙轍恥梔治淄熾 |
| | c0 | 痔痴癡稚穉緇緻置致蚩輜雉馳齒則勅 |
| | d0 | 飭親七柒漆侵寢枕沈浸琛砧針鍼蟄秤 |
| | e0 | 稱快他咤唾墮妥惰打拖朶楕舵駄駝 |
| | f0 | 倬卓啄坼度托拓擢啅柝濁濯琢琸託 |
| f7 | a0 | 鐸呑嘆坦彈憚歎灘炭綻誕奪脫探眈 |
| | b0 | 耽貪塔搭榻宕帑湯糖蕩兌台太怠態殆 |
| | c0 | 汰泰笞胎苔跆邰颱宅擇澤撑擄兎吐土 |
| | d0 | 討慟桶洞痛筒統通堆槌腿褪退頹偸套 |
| | e0 | 妬投透闘慝特闖坡婆巴把播擺杷波派 |
| | f0 | 爬琶破罷芭跛頗判坂板版瓣販辦鈑 |
| f8 | a0 | 阪八叭捌佩唄悖敗沛浿牌狽稗覇貝 |
| | b0 | 彭澎烹膨愎便偏扁片篇編翩邊鞭騙貶 |
| | c0 | 坪平枰萍評吠嬖幣廢弊斃肺蔽閉陛佈 |
| | d0 | 包匍匏咆哺圃布怖抛抱捕暴泡浦疱砲 |
| | e0 | 胞脯苞葡蒲袍褒逋鋪飽鮑幅暴曝瀑爆 |
| | f0 | 輻俵剽彪慓杓標漂瓢票表豹飇飄驃 |
| f9 | a0 | 品稟楓飄豊風馮彼披疲皮被避陂匹 |
| | b0 | 弼必泌珌畢疋筆苾秘乏逼下何厦夏廈 |
| | c0 | 昰河瑕荷蝦賀遐霞瘕壑學虐謔鶴寒恨 |
| | d0 | 悍旱汗漢澣瀚罕翰閑閒限韓割轄函含 |
| | e0 | 咸啣喊檻涵緘艦銜陷鹹合哈盒蛤閤闔 |
| | f0 | 陜亢伉姮嫦巷恒抗杭桁沆港缸肛航 |
| fa | a0 | 行降項亥偕咳垓奚孩害解楷海瀣蟹 |
| | b0 | 解該諧邂駭骸劾核倖幸杏荇行享向嚮 |
| | c0 | 珦鄉響饗香噓墟虛許憲櫶獻軒歇險 |
| | d0 | 驗奕爀赫革侐峴弦懸昡泫炫玄玹現眩 |
| | e0 | 睍絃絢縣舷衒見罥鋗顯子穴血頁嫌俠 |
| | f0 | 協夾峽挾浹狹莢鋏頰亨兄刑型 |

FIG. 6T

| UPPER | LOWER | 0 1 2 3 4 5 6 7 8 9 a b c d e f |
|---|---|---|
| fb | a0<br>b0<br>c0<br>d0<br>e0<br>f0 | 形洞菉澄瀅炯熒珩瑩荊螢衡迥邢嵤<br>幣兮彗恚懳哗憓蹊醯鞋乎冴呼壕壺好<br>岵弧戶應昊皓亳浩淏湖湖濠濠渡灝狐<br>琥瑚瓠皓祜糊縞胡葫萜虎號蝴護寰<br>鎬頀顥惑或酷婚昏混渾琿魂忽惚笏哄<br>弘乖泓洪烘紅虹訌鴻化和嬅樺火譁 |
| fc | a0<br>b0<br>c0<br>d0<br>e0<br>f0 | 禍禾花華話譁貨靴廓擴攫確碻稳丸<br>喚奐宦幻患換歡院桓渙煥環紈還鬟鰥<br>活滑猾豁闊凰怳徨恍惶愰慌晃梡況<br>湟滉潢煌璜篁簧荒蝗遑隍黃匯回廻<br>徊恢悔懷晦會檜淮澮灰獪繪膾茴蛔誨<br>賄劃獲宖橫鑊哮嗃孝效敩曉梟涍淆 |
| fd | a0<br>b0<br>c0<br>d0<br>e0<br>f0 | 爻肴酵驍侯候厚后吼喉嗅帿後朽煦<br>珝逅勛勳塤壎焄熏燻薰訓暈薨喧喧烜<br>萱卉喙毀毁徽揮暉煇諱輝麾休携烋咻<br>髹恤譎鷸兇凶匈洶胸黑昕欣炘痕吃屹<br>紇訖欠欽歆吸恰洽翕興僖熙喜噫囍姬<br>嬉希憙憘戲晞曦熹熺爔犧禧稀羲詰 |
| fe | a0<br>b0<br>c0<br>d0<br>e0<br>f0 | USER'S DEFINITION REGION<br>FOR CHINESE CHARACTER |
| ff | a0<br>b0<br>c0<br>d0<br>e0<br>f0 | NOT IN USE |

FIG. 10

1 COLUMN        18 COLUMN

| | | | | | | | | | | | | | | | | | | |
|---|---|---|---|---|---|---|---|---|---|---|---|---|---|---|---|---|---|---|
| | | | | | | | | | | | | | | | | | | ←1 ROW |
| | | | | | | | | | | | | | | | | | | ←2 ROW |
| | | | | | | | | | | | | | | | | | | ←3 ROW |
| | | | | | | | | | | | | | | | | | | ←4 ROW |
| | | | | | | | | | | | | | | | | | | ←5 ROW |
| | | | | | | | | | | | | | | | | | | ←6 ROW |
| | | | | | | | | | | | | | | | | | | ←7 ROW |
| | | | | | | | | | | | | | | | | | | ←8 ROW |
| | | | | | | | | | | | | | | | | | | ←9 ROW |
| 다 | 음 | 은 | | R | OL | L | | 표 | 시 | 법 | 의 | | 데 | 이 | 터 | | 전 | 송 | 에 | ←10 ROW |

FIG. 11

1 COLUMN        18 COLUMN

Row 9: 다 음 은 R OL L 표 시 법 의 데 이 터 전 송 에
Row 10: 대 한 예 를 보 인 것 이 다 .

FIG. 12

1 COLUMN · · · 18 COLUMN

|  |  |  |  |  |  |  |  |  |  |  |  |  |  |  |  |  |  |
|--|--|--|--|--|--|--|--|--|--|--|--|--|--|--|--|--|--|
|  |  |  |  |  |  |  |  |  |  |  |  |  |  |  |  |  |  | ← 1 ROW
|  |  |  |  |  |  |  |  |  |  |  |  |  |  |  |  |  |  | ← 2 ROW
|  |  |  |  |  |  |  |  |  |  |  |  |  |  |  |  |  |  | ← 3 ROW
|  |  |  |  |  |  |  |  |  |  |  |  |  |  |  |  |  |  | ← 4 ROW
|  |  |  |  |  |  |  |  |  |  |  |  |  |  |  |  |  |  | ← 5 ROW
|  |  |  |  |  |  |  |  |  |  |  |  |  |  |  |  |  |  | ← 6 ROW
|  |  |  |  |  |  |  |  |  |  |  |  |  |  |  |  |  |  | ← 7 ROW
|  |  |  |  |  |  |  |  |  |  |  |  |  |  |  |  |  |  | ← 8 ROW
|  | 대 | 한 | 예 | 를 |  | 보 | 인 | 것 | 이 | 다 | . |  |  |  |  |  |  | ← 9 ROW
|  | 또 | 한 |  | 줄 | 을 | R | OL | L- | UP | 시 | 킨 | 다 | . |  |  |  |  | ← 10 ROW

FIG. 13

1 COLUMN · · · 18 COLUMN

|  |  |  |  |  |  |  |  |  |  |  |  |  |  |  |  |  |  |
|--|--|--|--|--|--|--|--|--|--|--|--|--|--|--|--|--|--|
|  |  |  |  |  |  |  |  |  |  |  |  |  |  |  |  | R |  | ← 1 ROW
|  |  |  |  |  |  |  |  |  |  |  |  |  |  |  |  | O | 이 | ← 2 ROW
|  |  |  |  |  |  |  |  |  |  |  |  |  |  |  |  | L | 번 | ← 3 ROW
|  |  |  |  |  |  |  |  |  |  |  |  |  |  |  |  | L | 에 | ← 4 ROW
|  |  |  |  |  |  |  |  |  |  |  |  |  |  |  |  |  | 는 | ← 5 ROW
|  |  |  |  |  |  |  |  |  |  |  |  |  |  |  |  | 표 |  | ← 6 ROW
|  |  |  |  |  |  |  |  |  |  |  |  |  |  |  |  | 기 | 세 | ← 7 ROW
|  |  |  |  |  |  |  |  |  |  |  |  |  |  |  |  | 의 | 로 | ← 8 ROW
|  |  |  |  |  |  |  |  |  |  |  |  |  |  |  |  |  | 쓰 | ← 9 ROW
|  |  |  |  |  |  |  |  |  |  |  |  |  |  |  |  | 예 | 기 | ← 10 ROW

FIG. 14

|   |   |   |   |   |   |   |   |   |   |   |   |   |   |   |   | 를 | R |  ←1 ROW
|---|---|---|---|---|---|---|---|---|---|---|---|---|---|---|---|---|---|
|   |   |   |   |   |   |   |   |   |   |   |   |   |   |   |   |   | O | ←2 ROW
|   |   |   |   |   |   |   |   |   |   |   |   |   |   |   |   | 보 | L | ←3 ROW
|   |   |   |   |   |   |   |   |   |   |   |   |   |   |   |   | 인 | L | ←4 ROW
|   |   |   |   |   |   |   |   |   |   |   |   |   |   |   |   |   |   | ←5 ROW
|   |   |   |   |   |   |   |   |   |   |   |   |   |   |   |   | 것 | 표 | ←6 ROW
|   |   |   |   |   |   |   |   |   |   |   |   |   |   |   |   | 이 | 기 | ←7 ROW
|   |   |   |   |   |   |   |   |   |   |   |   |   |   |   |   | 다 | 의 | ←8 ROW
|   |   |   |   |   |   |   |   |   |   |   |   |   |   |   |   | 。 |   | ←9 ROW
|   |   |   |   |   |   |   |   |   |   |   |   |   |   |   |   |   | 예 | ←10 ROW

↑ 1 COLUMN      ↑ 18 COLUMN

FIG. 15

Row 2: 이 게 뭐 야 ?    한 글   자 막 이 지 !

↑ 1 COLUMN      ↑ 18 COLUMN

Rows 1, 3–10 empty.

FIG. 16

|  |  |  |  |  |  |  |  |  |  |  |  |  |  |  |  |  |  |
|--|--|--|--|--|--|--|--|--|--|--|--|--|--|--|--|--|--|
|  |  |  |  |  |  |  |  |  |  |  |  |  |  |  |  |  |  |
|  |  |  |  |  |  |  |  |  |  |  | 그 | 래 | ? |  |  |  |  |
|  | 잘 | 모 | 르 | 겠 | 어 |  |  | 실 | 은 | 나 | 도 | 몰 | 라 | . |  |  |  |
|  |  |  |  |  |  |  |  |  |  |  |  |  |  |  |  |  |  |

(1 COLUMN … 18 COLUMN; 1 ROW … 10 ROW)

FIG. 17

|  |  |  |  |  |  |  |  |  |  |  |  |  |  |  |  |  |  |
|--|--|--|--|--|--|--|--|--|--|--|--|--|--|--|--|--|--|
|  |  | = | = |  | 일 | 기 |  | 예 | 보 |  | = | = |  |  |  |  |  |
|  |  |  |  |  |  |  |  |  |  |  |  |  |  |  |  |  |  |
|  |  |  | 서 | 울 |  | 맑 | 음 |  | 0 | 도 |  |  |  |  |  |  |  |
|  |  |  | 데 | 전 |  | 흐 | 림 |  | 2 | 도 |  |  |  |  |  |  |  |
|  |  |  | 광 | 주 |  | 흐 | 림 |  | 4 | 도 |  |  |  |  |  |  |  |
|  |  |  | 부 | 산 |  | 비 |  |  | 3 | 도 |  |  |  |  |  |  |  |
|  |  |  | 대 | 구 |  | 비 |  |  | 3 | 도 |  |  |  |  |  |  |  |
|  |  |  | 춘 | 천 |  | 눈 |  |  | -4 | 도 |  |  |  |  |  |  |  |

(1 COLUMN … 18 COLUMN; 1 ROW … 10 ROW)

FIG. 18

1 COLUMN															18 COLUMN

| | | | | | | | | | | | | | | | | | |
|---|---|---|---|---|---|---|---|---|---|---|---|---|---|---|---|---|---|
| | | | | | | | | | | | | | | | | | | ←1 ROW
| | | | | 〈 | 내 | 일 | 의 | 경 | 기 | | 안 | 내 | 〉 | | | | | ←2 ROW
| | | | | | | | | | | | | | | | | | | ←3 ROW
| | 축 | 구 | | - | 오 | 후 | 2 | 시 | | ( | 수 | 원 | 축 | 구 | 장 | ) | | ←4 ROW
| | 농 | 구 | | - | 오 | 후 | 4 | 시 | | ( | 실 | 내 | 체 | 육 | 관 | ) | | ←5 ROW
| | 배 | 구 | | - | 오 | 전 | 10 | 시 | | ( | 학 | 생 | 체 | 육 | 관 | ) | | ←6 ROW
| | 탁 | 구 | | - | 오 | 전 | 11 | 시 | | ( | 서 | 울 | 대 | 체 | 육 | 관 | ) | ←7 ROW
| | 야 | 구 | | - | 오 | 후 | 5 | 시 | | ( | 잠 | 실 | 야 | 구 | 장 | ) | | ←8 ROW
| | | 위 | 내 | 용 | 은 | | 날 | 씨 | 관 | 계 | 로 | | 취 | 소 | 될 | 수 | | ←9 ROW
| | | 있 | 습 | 니 | 다 | . | | | | | | | | | | | | ←10 ROW

CLOSED-CAPTION BROADCASTING AND RECEIVING METHOD AND APPARATUS SUITABLE FOR SYLLABLE CHARACTERS

BACKGROUND OF THE INVENTION

1. Field of the Invention

The present invention relates to a closed-caption broadcasting and receiving method and apparatus, and more particularly, to a closed-caption broadcasting and receiving method and apparatus, whereby character and control codes are encoded in a television signal to be transmitted as a caption broadcasting signal, and then received to be displayed on a screen of a television receiver by selection of a viewer.

2. Description of the Related Art

The caption broadcasting system in television broadcasting can be classified into an open caption system for displaying a caption of emergency news, announcements, etc., on a television screen by selection of a broadcaster by superimposing the caption signal in an active period of a television signal, and a closed caption system for displaying a caption of words on the screen by selection of a viewer by encoding the caption signal in a non-active period, i.e., in a vertical blanking interval of the television signal.

The closed-caption broadcasting has been carried out in the United States since 1978 for people who have difficulty in hearing and cannot recognize the words of the scene without sign language. The closed-caption broadcasting is also useful in studying a foreign language.

The U.S. Pat. No. 5,294,982 issued on March, 1994 discloses a closed-caption broadcasting system suitable for displaying Roman characters and syllable characters. Especially, captioning of the syllable characters such as Korean is explained in detail in this patent. According to this patent, in order to broadcast Hangul (Korean alphabet) as a closed-caption, one Hangul character is separated into initial, medial, and final consonant phonemes and ASCII (American Standard Code for Information Interchange) codes corresponding to the respective consonant phonemes are transmitted. In a receiving part, the ASCII codes are received and decoded, and then the initial, medial, and final consonant phonemes are mapped to form and display the Hangul character.

However, according to this conventional Hangul closed-captioning system, since at least two or three bytes of data should be used for representing one Hangul character, the transmission speed and the display speed thereof become lowered. Also, its decoding process becomes complicated because the position of one Hangul character is searched by combination of three or four bytes of data, causing the cost of a caption decoder to increase.

Also, the conventional Hangul closed-captioning system has difficulty in simultaneously displaying Chinese characters, Hangul, and Japanese, and in simultaneously displaying English, Russian and Greek, as well as in displaying special symbols.

Also, since a control code is required in case of displaying word information between additional information and then displaying additional information again, there is no independence between the word information and additional information, and the control system for discriminating a display mode of the word information becomes complicated. If the display mode control code is not received at the start point of the receiving device's operation, the word information cannot be displayed until a next control code is received.

Further, since the conventional system has been developed based on the television broadcasting environment in the United States, it shows an inferior receiving state in the geographic setting of Korea that has mountainous districts over 70%, thereby deteriorating the quality of the caption display.

Meanwhile, related arts regarding the closed-caption broadcasting and receiving apparatuses are disclosed in U.S. Pat. Nos. 5,327,176, 4,310,854, 5,347,365, 5,249,050, 5,374,960, and 5,315,386, and Japanese Patent Laid-open Nos. 6-165065 and 6-165064.

SUMMARY OF THE INVENTION

It is an object of the present invention to solve the problems involved in the prior art, and to provide a viewer's selection type closed-caption broadcasting and receiving method especially having an effect on the caption broadcasting of syllable characters such as Hangul.

In one aspect of the present invention, there is provided a closed-caption broadcasting method comprising the steps of inputting first language character information and control information; producing a control code of 2 words by combining the control information with a mode control bit and a parity bit, and producing a character code of 2 words including a syllable character completion type code by combining the first language character information with a mode control bit and a parity bit; outputting a first digital-modulated caption signal by inputting the control code or the character code; inputting second language character information and control information; producing a control code of 2 words by combining the control information with a mode control bit and a parity bit, and producing a character code of 2 words including a syllable character completion type code by combining the second language character information with a mode control bit and a parity bit; outputting a second digital-modulated caption signal by inputting the control code or the character code; discriminating a field of a television video signal; selecting the first caption signal if the field is discriminated as an odd field while selecting the second caption signal if the field is discriminated as an even field; and encoding the selected caption signal in a scanning line which does not affect the television video signal to transmit the caption signal.

In another aspect of the present invention, there is provided a closed-caption broadcast receiving method comprising the steps of detecting a sync signal of a received television signal; extracting a caption signal encoded in a scanning line in response to the detected sync signal; restoring digital data from the extracted caption signal; detecting an error of the restored data; storing in a first RAM (random access memory) data of the odd field while storing in a second RAM data of the even field among the error-detected data; decoding a control code of the data read out from the first and/or second RAM, and reading out character data corresponding to a character code from a font ROM (read only memory) wherein the character data based on a syllable character completion type code is stored to store the read-out character data in a display memory; and converting the character data stored in the display memory into a video signal in response to the decoded control information to display the video signal on a display screen.

BRIEF DESCRIPTION OF THE DRAWINGS

The above object, other features and advantages of the present invention will become more apparent by describing the preferred embodiments thereof with reference to the accompanying drawings, in which:

FIG. 2 is a block diagram of a television receiver incorporating the viewer's selection type caption broadcast receiving apparatus according to the present invention.

FIG. 3 is a view illustrating the structure of the caption signal according to the present invention.

FIG. 5 is a view explaining the control code according to the present invention.

FIGS. 6A to 6T are views illustrating Hangul completion type code tables explaining the structure of the character code according to the present invention.

FIGS. 10 to 12 are views explaining the scroll function of caption displayed on the screen by horizontal writing according to the present invention.

FIGS. 13 and 14 are views explaining the scroll function of a caption displayed on the screen by vertical writing according to the present invention.

FIGS. 15 and 16 are views explaining the pop-on function of a caption displayed on the screen in a word caption mode.

FIGS. 17 and 18 are views explaining the display state of a caption in an additional information mode.

DETAILED DESCRIPTION OF THE PREFERRED EMBODIMENTS

Figure 1:
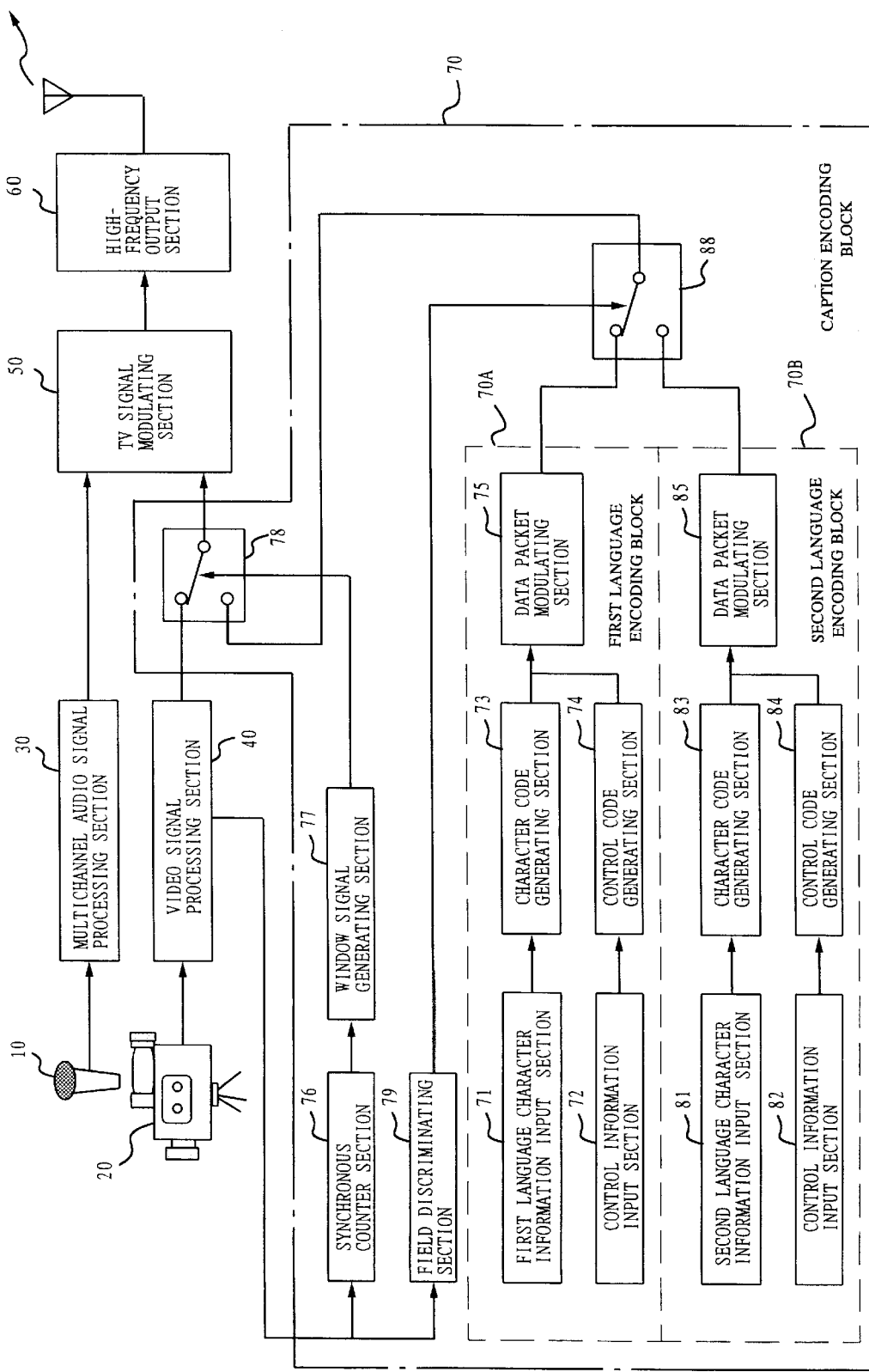
FIG. 1 is a block diagram of a television broadcasting system incorporating the viewer's selection type caption broadcasting apparatus according to the present invention.

FIG. 1 shows the structure of a television broadcasting system incorporating a viewer's selection type caption broadcasting apparatus according to the present invention.

Referring to FIG. 1, audio signals of first and second languages inputted through a microphone 10 are mixed and amplified by a multichannel audio signal processing section 30 and then provided to a television (TV) signal modulating section 50. A video signal inputted through a video camera 20 is amplified and edited by a video signal processing section 40 and then provided to the TV signal modulating section 50. The TV signal modulating section 50 frequency-modulates the audio signal, amplitude-modulates the video signal by vestigial-sideband modulation, and frequency-multiplexes and frequency-transits the amplitude-modulated (AM) signal and the frequency-modulated (FM) signal to produce a high-frequency signal. The high frequency signal is then amplified by a high-frequency output section 60 to be transmitted through an antenna as a television signal.

First language word information related to the television screen or additional information such as emergency news, announcements, etc., is inputted to a first language encoding block 70A of a caption encoding block 70 through a character information input section 71. Various control information for the caption control is inputted through a control information input section 72. The character information input section 71 includes a keyboard for inputting characters of Hangul, English, Chinese, Japanese, etc., and special characters, and outputs syllable characters, for example, a 2-byte Hangul completion type code (KSC 5901) in response to the input character information. The control information input section 72 includes keypads such as mode selection key, function selection key, etc., and outputs a 7-bit binary code in response to the input control information.

A character code generating section 73 uses the MSB (most significant bit) of each byte of the input 2-byte character code as a caption word/additional information flag, and generates a data packet of an 18-bit character code by replacing the MSB by "0" in case of the additional information and then adding a parity bit to each byte.

A control code generating section 74 generates a data packet of an 18-bit control code by dividing the input 7-bit control information into upper 4 bits and lower 3 bits, creating an upper byte by adding to the upper 4 bits a parity bit, control code discriminating bits of 2 bits, and a word/addition flag, creating a lower byte by adding to the lower 3 bits a first parity bit, a second parity bit, control code discriminating bits of 2 bits, and a caption word/additional information flag, and then adding a parity bit to each created byte. A detailed explanation about the data packet will follow.

A data packet modulating section 75 modulates the data packet generated by the character code generating section 73 or the control code generating section 74 by digital modulation.

A second language encoding block 70B of the caption encoding block 70 has the same structure as the first language encoding block 70A as described above, and encodes the second language character code. A second language character information input section 81, control information input section 82, character code generating section 83, control code generating section 84, and data packet modulating section 85 perform the same functions as the first language character information input section 71, control information input section 72, character code generating section 73, control code generating section 74, and data packet modulating section 75, respectively. Thus, a detailed description of these elements is omitted here.

A synchronous counter section 76 receives a sync signal provided from the video signal processing section 40, and is reset by a vertical sync signal. The synchronous counter section 76 counts a horizontal sync signal to select the 262nd scanning line of an odd field and the 525th scanning line of an even field.

A window signal generating section 77 receives the counted value of the synchronous counter section 76 and generates a window signal, which is a switching control signal of a switching section 78 for superimposing the caption signal in specific lines, for example, in the 262nd and 525th scanning lines of the video signal outputted from the video signal processing section 40.

A field discriminating section 79 discriminates between the odd field and the even field in accordance with the input sync signal, and outputs the discrimination signal.

A first switching section 88, in response to the field signal, selects the first language caption signal in case of the odd field, and selects the second language caption signal in case of the even field, to provide the selected caption signal to a second switching section 78.

FIG. 2 shows the structure of a television receiver incorporating the viewer's selection type caption broadcast receiving apparatus according to the present invention.

Referring to FIG. 2, a tuner 110 selects a television signal of a selected channel among high frequency signals received through an antenna, and demodulates the selected television signal to output an audio signal and a video signal. The audio signal is separated into first and second language audio signals, equalized, and amplified by the multichannel audio signal processing section 120, and then the separated audio signals are outputted to a loudspeaker 130. The video signal is luminance-processed and chrominance-processed by the video signal processing section 140 to be outputted as a composite video signal. The composite video signal is provided to a display driving section 160 through a mixer 150. The display driving section 160 drives a CRT (cathode ray tube) 170 in response to the composite video signal to display a corresponding image on the screen of the CRT 170.

In a caption decoding block 200, the video signal is converted into a digital signal through a data extractor 210, and the digital signal is inputted to a caption processing section 230. The data extractor 210 may comprise an analog-to-digital (A/D) converter, or a slice integrated circuit. At the same time, a sync separator 220 separates vertical and horizontal sync signals from the video signal, and outputs the sync signals to the caption processing section 230.

Figure 20:
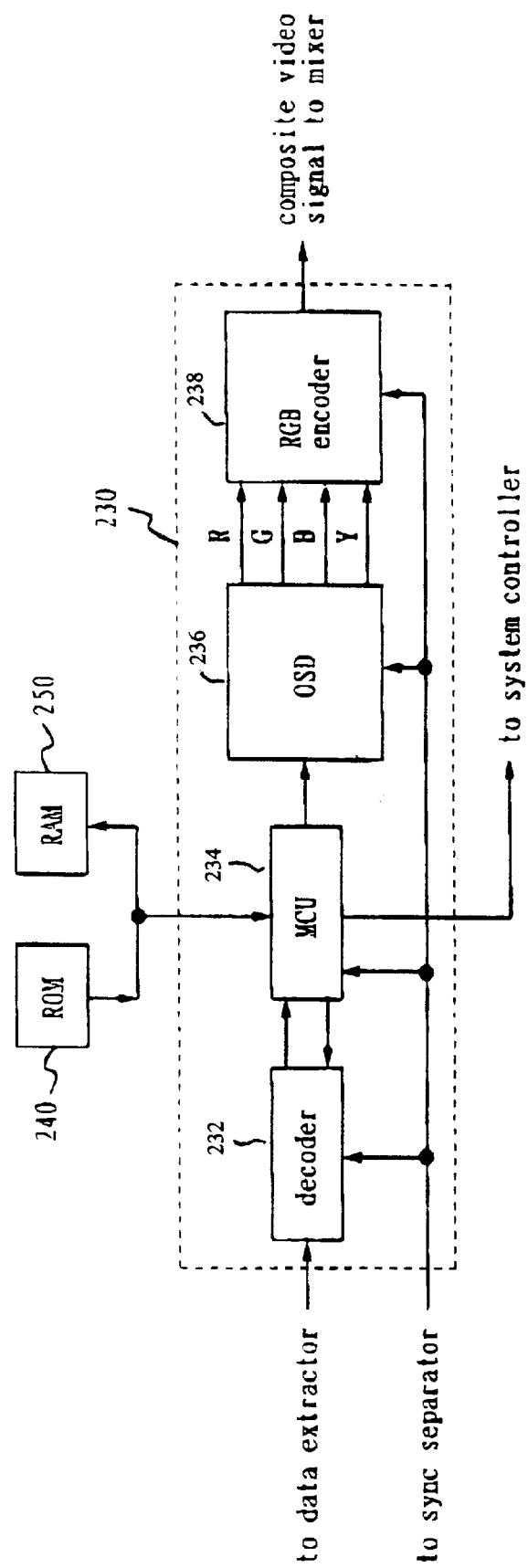
FIG. 20 is a block diagram of a caption processing section shown in FIG. 2.

As shown in FIG. 20, the caption processing section 230 includes a decoder 232, microcomputer 234, on-screen generator 236, and RGB (red, green, blue) encoder 238. The decoder 232, which comprises an ASIC chip, analyzes the data extracted by the data extractor 210, detects the existence of error in the data, and stores and updates the additional information. The microcomputer 234 performs data communications with a system control section 180, and analyzes the data provided from the decoder 232. If the data is the control code, the microcomputer 234 performs the corresponding control process, and if the data is the character code which uses the 16 bit Hangul completion type code, the microcomputer 234 stores in first and second RAMs 250 and 252 values. The stored values are used as addresses of a font ROM 240 which uses the 16 bit Hangul completion type code. Specifically, the microcomputer 234 stores the caption signal of the odd field in the first RAM 250, and stores the caption signal of the even field in the second RAM 252. In the first RAM 250, the data of the first language is stored, and in the second RAM 252, the data of the second language is stored. The on-screen generator 236 generates Y (luminance), R (red), G (green), and B (blue) signals in accordance with the data read out from the font ROM 240 which is addressed by the values stored in the first and second RAMs 250 and 252. The RGB encoder 238 includes an encoder for producing a composite video signal according to the Y, R, G, and B signals. The composite video signal is provided to the mixer 150.

The font ROM 240 contains bit-map type character information which corresponds to the Hangul completion type KSC 5601 code value.

A command input section 190 comprises a remote controller and/or a key input section, and contains at least the following caption-related command functions:

display of reception or non-reception of a caption packet in a field display of the receiving sensitivity of a caption display of existence or nonexistence of two languages display of reception or non-reception of additional information on/off function of caption words on/off function of additional information holding function of an additional information page selection function of caption words of two languages prevention function of vertical writing Accordingly, if a command signal for selecting one of the caption words of two languages is inputted through the command input section 190, this command signal is transferred to the microcomputer of the caption control section 230 through the system controller 180, so that the microcomputer controls the first or second RAM to display the caption words of the corresponding language.

The detailed structure of a caption signal for use in the caption broadcasting and receiving systems as described above will be explained.

In Korea, an M-NTSC type television signal having 525 scanning lines, 60 fields per second, has been used as a broadcasting signal. It is prescribed that vertical blanking intervals exist in the range of 1st to 20th scanning lines in the odd fields, and in the range of 264th to 282nd scanning lines in the even fields.

A standard of use of vertical blanking intervals has not yet been provided by organizations concerned, but ITU-R Recommendation 473-2, and FCC Report and Order 83-120 in the United States may serve as a reference.

In order to transmit caption data, one of 10th to 20th lines of vertical blanking intervals, and 21st, 262nd, and 525th lines in active video periods may be used. Also, more than one line may be used for increasing the data transmission rate or for other purposes.

The transmission bit rate of the caption data should be in the range of 447443.125 bps ±125 bps, and the maximum value of the long-term variation should be less than ±196 (0.0125 bps). The caption data signal should be necessarily used only in transmitting a color television signal. Further, the transmission bit rate is determined to be ⅛ of the chrominance subcarrier frequency fsc (3579545±10 Hz), and the chrominance subcarrier is frequency-synchronized with a color burst. It is preferable that the chrominance subcarrier has a continuous phase between the scanning lines. In the event that the phase of the chrominance subcarrier is discontinuous due to the picture editing, the chrominance subcarrier should be frequency-synchronized at least with the color burst of the corresponding line.

The data is modulated by digital modulation named BPSK (binary phase shift keying) or PRK (phase reversal keying) whereby a logic value of "1" is represented by one period of a sine wave having a phase of "0" degree and having a frequency of fsc/8 (447.443 KHz), and a logic value of "0" is represented by one period of a sine wave having a phase of 180 degrees and having a frequency of fsc/8 (447.443 KHz). The maximum range of the phase jitter is ±10. The optimum signal waveform can be changed in accordance with the frequency spectrum characteristic of a television channel, and will be prescribed hereafter. However, since severe distortion of the BPSK waveform may occur in a region where the transition of the logic value is generated due to the basic band limit frequency, the waveform, which passed through a second Butterworth filter having a cut-off frequency of 3.5 MHz and then phase-compensated, will be used in broadcasting. The impulse response of the Butterworth filter to be used is expressed by $$|H(f)| = \frac{1}{\sqrt{1 + (f/fc)^4}} \quad \text{(where } fc = 3.5 \text{ MHz)}$$

Examination No. 1–7 (television broadcasting station), Item 4 (teletext), Paragraph Na (superimposing position of a data line and an amplitude of a character signal), among Korean Radio Station Examination Items defines an examination method and ground. Since the waveform of the caption signal is not an NRZ (non-return-to-zero) waveform, but is a pure sine wave, it is not required to apply the above-described standard. However, in order to extend the receiving districts, considering the geographic setting of Korea having mountainous districts over 70%, the maximum value of the sine wave will be determined to be 90±5 IRE. Since the data signal may include an overshoot due to the filter pass-band characteristic, etc., though the maximum amplitude of normal data signal is defined, the maximum absolute value of the overshoot will be determined to be 5 IRE.

Referring to FIG. 3, the data line of the caption signal includes a bit clock sync signal 302 of 6 periods, a word start signal 304, and a data line of 18 bits.

The bit clock sync signal 302, which is a sine wave of 6 periods, is extracted by the caption decoding block, and a frequency of fsc/4 (894.886 KHz) is used for reading the bit period of the 18-bit data. The bit clock sync signal 302 starts at a point which is apart from the center point OH of the falling edge of the horizontal sync signal by 9.5 $\mu$s (34 periods of the color burst) in the event that the phase of the chrominance subcarrier of the corresponding scanning line is 0 degree, while it starts at a point which is apart from the center point OH of the falling edge of the horizontal sync signal by 9.64 $\mu$s (34.5 periods of the color burst) in the event that the phase of the chrominance subcarrier of the corresponding scanning line is 180 degrees.

The bit clock sync signal is frequency-synchronized with the color burst of the corresponding line, and thus it can be extracted from the color burst.

The word start signal 304 has a frequency of fsc/16 (223.722 KHz), and corresponds to one period of the sine wave having a phase of 180 degrees. The word start signal 304 indicates the start of the 18-bit data packet.

The data line 306 includes 18 bits, and has a bit rate of fsc/8 (447.443 KHz). The data line 306 is modulated by BPSK modulation.

Figure 4A:
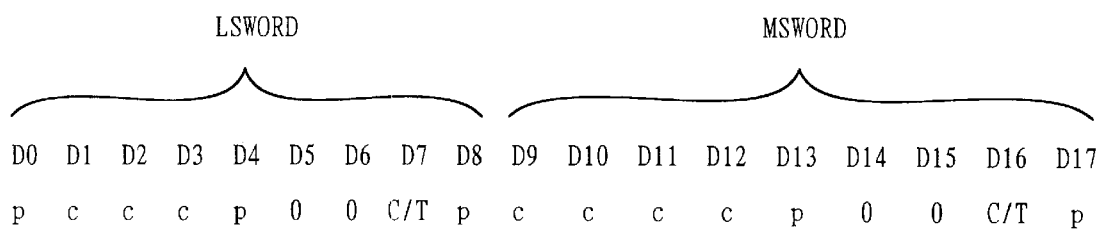
FIGS. 4A and 4B are views illustrating the data packet structure of the caption signal according to the present invention.
Figure 4B:
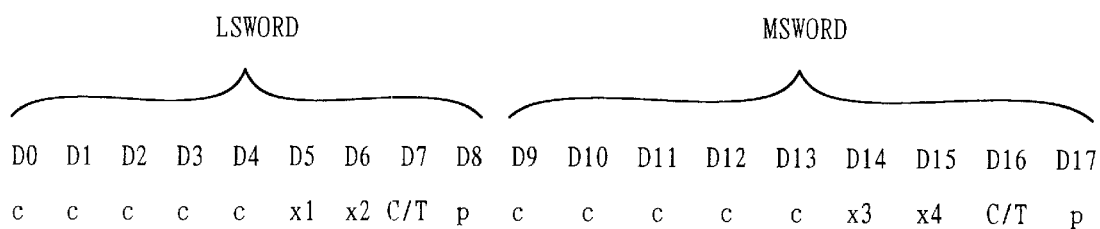

Referring to FIGS. 4A and 4B, the data packet includes three parts, that is, a parity P in the unit of a word, a caption word/additional information flag C/T, and a code value. D0 to D8 denote lower words, D9–D17 denote upper words, and D17 denotes an even parity for firstly detecting an error of transmission. D7 and D16 are caption word/additional information flags which have the value of "0" in case of the caption words, while having the value of "1" in case of the additional information. The values of D7 and D16 should necessarily coincide with each other. These flags are used for keeping the priority order of the words. D0 to D6, and D9 to D15 denote the code values. If all the code values of D5, D6, D14, and D15 are "0", the code is analyzed as a control code. Otherwise, it is analyzed as a character code.

Referring to FIG. 4A, D1, D2, D3, D9, D10, D11, and D12 of the 7-bit control code are control code data bits, and D0, D4, D8, and D13 are parity bits for the control code data bits. As shown in FIG. 5, the 3-bit code value of the lower words is for designating five functions of color designation, character attribution and roll-up, display method and roll-down, movement of position, and designation of matrix position. The 4-bit code value of the upper words of the control code designates 16 subfunctions for the respective functions as above. Here, D0 is a parity for D1, D2, D3, and D4, D4 is a parity for D1, D2, D10, and D11, and D13 is a parity for D9, D10, D11, and D12.

Also, the control code is consecutively twice transmitted for the safe reception of data, and the horizontal/vertical writing designation code and the matrix position designation code are periodically transmitted every 4 seconds. A detailed description of the control code will follow.

Referring to FIGS. 6A to 6T, the character code includes data bits of KSC 5601 code including lower words of D0 to D6 and upper words of D9 to D15. D8 is an even parity for D0 to D7.

According to the present invention, the ASCII code is not used. The 7 bits of D0 to D6 correspond to the lower byte of KSC 5601 except for the MSB, and the 7 bits of D9 to D15 correspond to the upper byte thereof except for the MSB. Among the Hangul completion type codes (KSC 5601) illustrated in FIGS. 6A to 6T, a1 and a2 lines (special character), a3 line (English), a4 line (final consonant phoneme), a5 line (Greek), aa and ab lines (Japanese Hiragana/Katakana), ac line (Russian), b0 to c8 lines (Hangul), and ca to fd lines (Chinese characters) are limitedly used. The character code is transmitted once for a character.

As described above, the Hangul caption can be transmitted using any line in a field, and thus at least one transmission line in a field is defined as a channel. The NTSC type television constructs two fields by interlaced scanning, and thus two channels may be used in captioning. Specifically, caption words composed of two languages such as for a multivoice system may be used. In this case, an odd field channel is used for the Hangul caption words, and an even field channel is used for caption words of a foreign language. The control code transmitted through each channel is the same code set, and all the character codes are included in KSC 5601.

Two kinds of information are transmitted through the channels for captioning, and the analysis and display method thereof are changed in accordance with the kinds of information. One is a caption word related to the video signal being broadcast, while the other is additional information TEXT having no relation to the contents of the broadcast signal displayed on the screen.

In the LSWord and MSWord of the data packet structure, if the values of the caption word/additional information flags are all "0", the code is analyzed as that for displaying the caption words regardless of whether the code is a control code or a character code. In this case, the words which coincide with the audio signal are displayed as a caption, covering a portion of the picture.

About 2 to 5 rows of the caption words are simultaneously used. In order to display the continuous words, the caption words should be scrolled up within a predetermined caption display region of the screen, or new caption words should be displayed on the predetermined region after the previous caption words are erased therefrom.

In transmitting the caption signal through one channel, characters of several languages may be mixed, or the Hangul characters or the characters of a foreign language are exclusively transmitted through the channel. In transmitting the caption through two channels, the channels are divided into one for the exclusive use of the Hangul and the other for the exclusive use of the foreign language.

Since it is preferable that the caption words coincide with the audio information, the caption words have priority over the additional information in occupying the channel in the unit of 2 words.

In the LSWord and MSWord of the data packet structure, if the values of the caption word/additional information flag are all "1", the code is analyzed as that for displaying the additional information regardless of whether the code is a control code or a character code. The additional information is displayed over the entire screen such as in the computer communication regardless of the contents of the broadcasting signal. At this time, the scroll function is not used.

In transmitting the additional information through two channels, it is not required to divide the additional information as the caption information. The additional information can occupy the channels any time when the caption information is not carried through the channels, but when the caption words are to be transmitted, the right of channel occupation is immediately transferred thereto. The channel can be occupied by the additional information only after the transmission of the caption words is completed.

Next, the caption display according to the horizontal writings in a television receiver will be explained.

Figure 7:
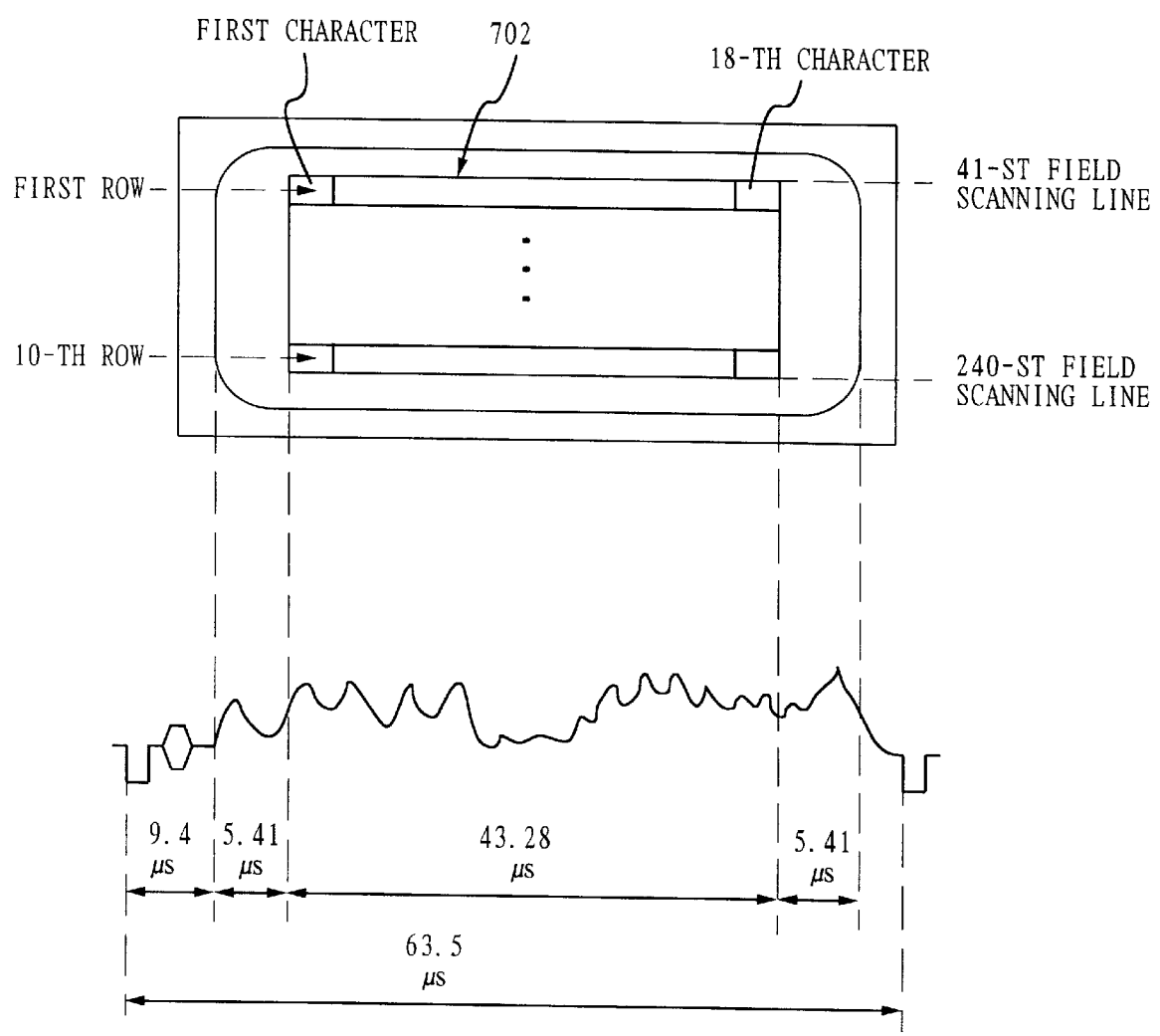
FIG. 7 is a view explaining the size of the caption region displayed on a screen according to the present invention.

Referring to FIG. 7, a caption display region 702 means a maximum screen region where caption words and additional information can be displayed. According to the NTSC type television signal in the unit of a field, the caption display region 702 corresponds to the scanning lines in the range of 41st to 240th lines, and has a height corresponding 200 scanning lines per field. Over the entire caption display region, 10 character rows are displayed. The width of the caption display region on the screen is determined to be about 80~85% of that (52.6 $\mu$s) of the effective scanning lines, and thus the horizontal length of all character rows is 80~85% of the effective scanning line's width.

Since display cells of Hangul, English, and Chinese characters constitute a vertical 20-bit map, one character row including Hangul, English, and Chinese characters corresponds to 20 television scanning lines.

The maximum number of characters of Hangul and Japanese Hiragana/Katakana to be displayed in a row is determined to be 18. The width of an English character corresponds to a half of Hangul character, and thus the maximum number of English characters to be displayed in a row is 36. The Roman alphabet, Arabian numerals, and sentence symbols are considered the same as the English alphabet.

The width of one Chinese character is the same as a Hangul character, and thus the maximum number of Chinese characters to be displayed in a row is also 18.

All the characters supported by the KSC 5601 code can be used and displayed together. If so, 18 characters at a minimum through 36 characters at a maximum can be displayed in a row.

Figure 8C:
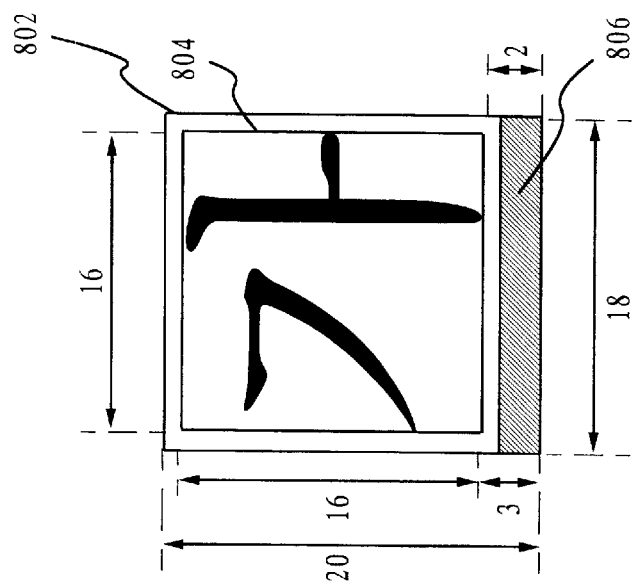
FIGS. 8A to 8C are views explaining character cells of Hangul, Chinese character, and English, and corresponding display cells arranged for horizontal writing according to the present invention.
Figure 8B:
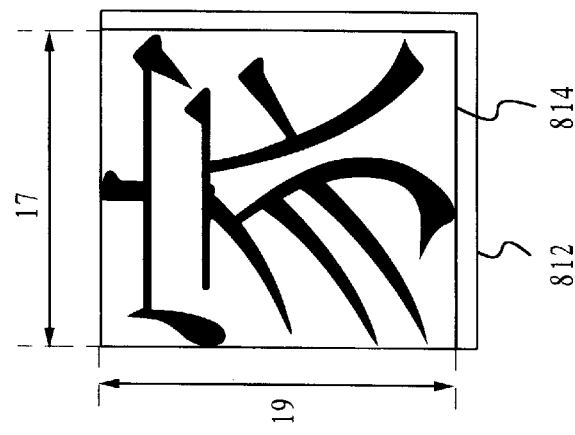
Figure 8A:
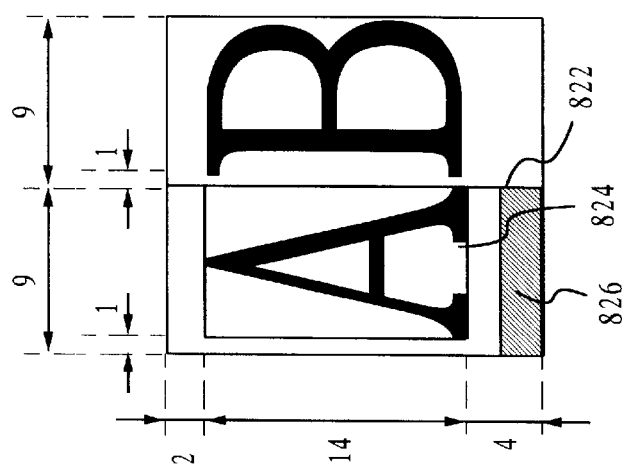

Referring to FIGS. 8A to 8C, when a character is displayed on the screen, a character cell 804, 814, or 824 represents a region occupied by a character itself without considering the space between characters, and a display cell 802, 812, or 822 represents a region occupied by a character in consideration of the space around the character.

The character cell 804 of one Hangul syllable to be displayed on the screen has a format of a 16×16 bit-map, and thus a Hangul character to be placed in the character cell is read out from a ROM which stores therein a 16×16 bit-map font.

In FIG. 8A, the display cell 802 of a Hangul syllable in consideration of the space between the characters has an 18×20 bit-map format so as to leave a space from the Hangul character cell 84 in upper, left, and right directions, respectively. In a lower direction, 2 spaces are additionally assigned to secure an underline region 806.

The caption display format of Japanese Hiragana/Katakana is the same as that of Hangul.

In FIG. 8B, the character cell 814 of a Chinese character to be displayed on the screen has a format of 17×19 bit-map. The size of the Chinese character cell is provisionally determined, and then a different size, for example, a 16×16 size, may be determined according to the conditions of the font ROM and the internal circuit of the receiver.

The display cell 812 of a Chinese character in consideration of the space between the characters has an 18×20 bit-map format so as to leave a space from the Chinese character cell 814 in right and lower directions, respectively. Unlike Hangul or English, an underline region is not assigned to the Chinese character.

Accordingly, the width and height of the Chinese display cell 812 are the same as those of the Hangul display cell 802. As a result, the Chinese character has the same size as the Hangul character.

In FIG. 8C, the character cell 824 of an English character to be displayed on the screen has an 8×14 bit-map format.

The display cell 822 of an English character in consideration of the space between characters has a 9×20 bit-map format so as to leave 2 spaces in an upper direction, and one space in a right direction from the English character cell 824, respectively. In a lower direction, 2 spaces, in addition to the 2 spaces already mentioned, are assigned to secure an underline region 826.

Accordingly, the width of the English display cell 822 is a half of that of the Hangul display cell 802, and the height of the English display cell 822 is the same as that of the Hangul display cell 802. As a result, the size of the Hangul character is twice as large as that of the English character.

The Roman alphabet, Arabian numerals, and sentence symbols including a space character between the words are considered the same as the English alphabet.

In processing the character display within the display cell, an opaque ground process or a shadowed-edge process is performed in accordance with a control code of "ground color designation". The opaque ground may be changed to a semitransparent ground.

In the event that characters are displayed on the screen by the opaque ground process, the front portion of the first character as well as the rear portion of the last character, whose size corresponds to a Hangul syllable, may be processed as the opaque ground for convenience in reading.

Details of the control code will now be explained with reference to FIG. 5.

The control code includes two 9-bit words. Bits of D1, D2, and D3 for function classification are included in LSWord, and bits of D9, D10, D11, and D12 for selecting one of the classified functions are included in MSWord.

The control code is classified into control codes for color designation, attribute designation, display control, scrolling, cursor movement, and row/column position designation.

The color designation control code is a code for changing foreground and background colors of character data. Accordingly, if it is desired to change the foreground and background colors of the characters to be transmitted, the color designation control code is first transmitted and then the characters are transmitted. The receiver determines the foreground and background colors in accordance with the color designation control code received most recently. The foreground and background colors may be changed simultaneously or independently. The designated colors are black, red, magenta, blue, cyan, green, yellow, and white. If the background color is determined to be a transparent color, the television image can be shown on the remaining portion of the display cell except for the character portion. At this time, the characters are outline-processed with a color different from that of the characters.

The character attribute control code is a code for changing the attribute of character data. Accordingly, if it is desired to change the attribute of the characters to be transmitted, the attribute designation control code is first transmitted and then the character code is transmitted. Functions of normal display, underline, blinking, and reverse display can be designated by the attribute designation control code. Since the functions of underline, blinking, and reverse display are independently performed, all the attributes can be applied at a time.

Functions of the attribute designation control code are as follows:

Underline: An underline is displayed just below each character to be displayed.

Blinking: A displayed character is blinking. A previously displayed portion does not blink, but a presently displayed portion is blinking. The period of blinking is variably determined according to the specification of the receiver.

Reverse display: The colors of the foreground and background presently used in the receiver are changed from each other.

Normal display: All the attributes which have been designated are reset, and characters are displayed as a default attribute.

The display method control code is a control code for controlling the display mode of the characters to be transmitted. According to this code, on-display, off-display, receive/store, horizontal writing, and vertical writing can be designated.

On-display: The received character data is directly displayed on the screen (in a roll-up or roll-down mode), or the data stored by a control code of "receive/store" is displayed on the screen (in a pop-on mode).

Receive/store: The received character and control data are stored until the on-display is performed.

Horizontal writing: When the character codes successively received are displayed on the screen without intervention of the position movement control code, the position of a following character is moved to the right side of the presently displayed character.

Vertical writing: When the character codes successively received are displayed on the screen without intervention of the position movement control code, the position of a following character is moved to the lower position of the presently displayed character. The scroll control code is a code for scrolling up a predetermined portion of the caption display region, and is classified into a roll-up captioning of 2 to 5 rows and a roll-down captioning of 2 to 5 rows.

Roll-up of 2 to 5 rows: The 2 to 5 rows including the display position of the presently displayed character (the position of a cursor), which constitute a window, are scrolled up for one row. Among the selected rows of the window, the uppermost row disappears from the screen by scrolling, and the lowermost row is replaced by the characters decoded most recently. In using this scroll control code, a separate APDR (active position down return for the movement to the first character position of the lower row) code is not required, and all the characters outside the designated window are erased from the screen.

Roll-down of 2 to 5 rows: The 2 to 5 rows including the display position of the presently displayed character (the position of a cursor) are scrolled down for one row in a predetermined window. Among the selected rows of the window, the lowermost row disappears from the screen by scrolling, and the uppermost row is replaced by the characters decoded most recently. In using the scroll control code, a separate APUR (active position up return for the movement to the first character position of the upper row) code is not required, and all the characters outside the window are erased from the screen.

The position movement control code is a code for moving the display position of the character.

APF (active position forward): In case of the horizontal writing, the display position moves in the right direction for half the width of a Hangul character (the width of an English character). In case of the vertical writing, the display position moves in the lower direction for the height of a Hangul character.

APB (active position backward): In case of the horizontal writing, the display position moves in the left direction for half the width of a Hangul character (the width of an English character). In case of the vertical writing, the display position moves in the upper direction for the height of a Hangul character.

APDR (active position down return): In case of the horizontal writing, the display position moves to a first column position, i.e., to the very left character position of the just lower row. In case of the vertical writing, the display position moves to a first row position, i.e., to the uppermost character position of the just left column. The display position moves in the lower direction for the height of a Hangul character.

APUR (active position up return): In case of the horizontal writing, the display position moves to the first column position, i.e., to the very left character position of the just upper row. In case of the vertical writing, the display position moves to the first row position, i.e., to the uppermost character position of the just right column.

APF of 3 to 6 characters: In case of the horizontal writing, the APF is performed for the whole width of 3 to 6 English characters. In case of the vertical writing, the APF is performed for the whole height of 3 to 6 Hangul characters.

In exceptional cases of the position movement control as described above, the following processes are performed.

Specifically, if a character code is received without any control code related to position movement such as APDR, APUR, APB, roll-up of 2 to 5 rows, roll-down of 2 to 5 rows, etc., when the characters are displayed up to the right character position (the 18th column position) of the row in case of the horizontal writing, the character is displayed after the display position thereof moves to the very left character position (the first column position) of the row, without changing the row. At this time, if the received character code is a space code, it is disregarded until another character code which is not a space code is received. If a character code is received without any control code related to position movement such as APDR, APUR, PDB, roll-up of 2 to 5 rows, roll-down of 2 to 5 rows, etc., when the characters are displayed up to the very lower character position (the 10th row position) of the column in case of the vertical writing, the character is displayed after the display position thereof moves to the uppermost character position (the first row position) of the column, without changing the column. At this time, if the received character code is a space code, it is disregarded until another character code which is not a space code is received.

Transmission of a control code in accordance with a display mode is as follows:

The transmission of the control code in a pop-on mode is performed in the order of "receive/store+(another control code)+character row+(another control code)+ . . . +off-display+on-display+receive/store+(another control code)+character row+(another control code)+ . . . +off-display+on-display+ . . . ". In order for a viewer to properly view the character information displayed on the screen in the pop-on mode, a proper delay time is necessarily required before the off-display control code is transmitted from the transmission part.

The transmission of the control code in a roll-up mode is performed in the order of "on-display+(another control code)+character row+(roll-up of 2 to 5 rows)+on-display+(another control code)+character row+(another control code)+character row +(roll-up of 2 to 5 rows)+ . . . ". The external region of the window, which is determined every time when the control code for roll-up of 2 to 5 rows is received, should be erased with a transparent color.

The transmission of the control code in a roll-down mode is performed in the order of "on-display+(another control code)+character row+(another control code)+character row+(roll-down of 2 to 5 rows)+on-display+(another control code)+character row +(another control code)+character row+(roll-down of 2 to 5 rows)+ . . . ". The external region of the window, which is determined every time when the control code for roll-down of 2 to 5 rows is received, should be erased with a transparent color.

The process of the control code in case of the vertical writing is as follows:

If a control code for vertical writing is decoded in the receiver, the display of the Hangul characters is changed to a column direction.

The vertical writing is mainly used in the event that a caption already exists in the broadcasting signal. The structure of the character cell in the vertical writing is not required to be the same as the character cells of the respective characters.

Figure 9A:
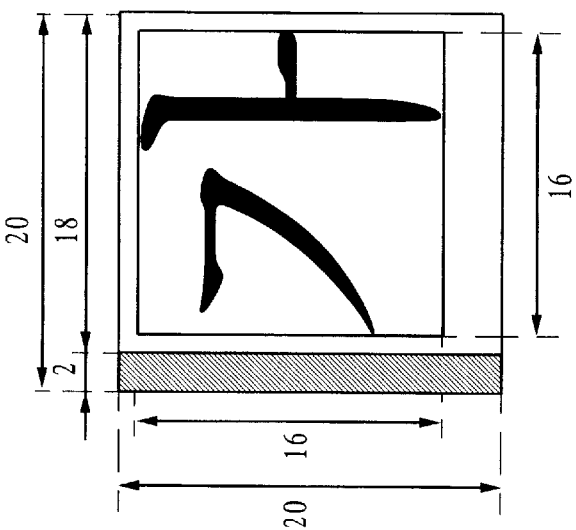
FIGS. 9A to 9C are views explaining character cells of Hangul, Chinese character, and English, and corresponding display cells arranged for vertical writing according to the present invention.
Figure 9B:
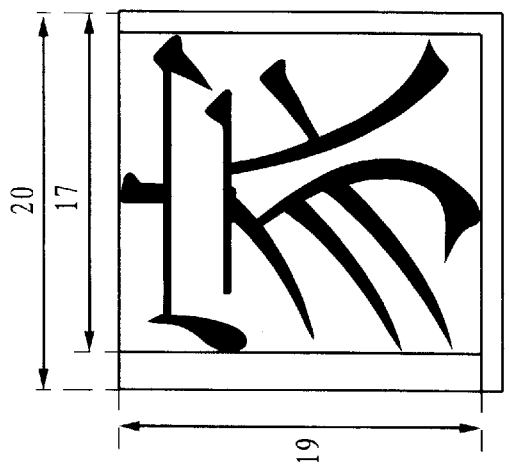
Figure 9C:
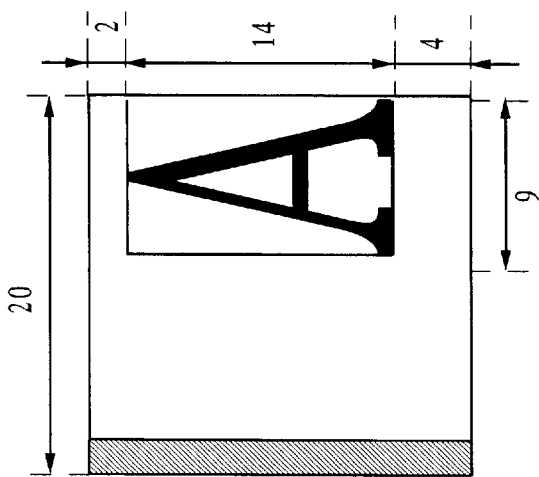

Referring to FIGS. 9A through 9C, in case of the vertical writing, the display cell's sizes of all kinds of characters coincide with one another regardless of the character cell's sizes of the respective characters. For example, the entire region occupied by an English character on the screen should coincide with that occupied by a Hangul character in consideration of the space between the characters in case of the vertical writing. In displaying the English character by the vertical writing, since the width of the English character cell corresponds to half the width of the Hangul character when font data is used in the vertical writing, the position of the English character cell of the corresponding display cell is determined to be included in a right half of the Hangul character cell as shown in FIG. 9C. In case of the vertical writing, since the underline designated by the underline designation is displayed on the right side of the character cell, the structure of the display cell will be different from that in case of the vertical writing, which may be determined in a different way in accordance with the view of the receiver. However, the display cell in case of the vertical writing should have enough size to include any of the character cells of all the characters.

In case of the vertical writing, it is comfortable to view the caption words when the column space is wider than the row space, and thus it is preferable that the structure of the character matrix in the caption display region is reconstructed. Specifically, in order to widen the column space in case of the vertical writing, the number of columns to be displayed is determined to be 16, and the number of characters to be displayed in a column is determined to be 10. Since all the characters have a character cell of the same size in case of the vertical writing, a 10×16 (row×column) character matrix is displayed over the entire screen. The caption region has the same width as that in case of the horizontal writing, and has a height smaller than or equal to that in case of the horizontal writing. Accordingly, the column space in the vertical writing is smaller than or equal to that in the horizontal writing, providing convenience in vertical reading. The column spaces should be identical to one another.

The default position of the receiver, when a specific position control code is not received in case of the vertical writing, is determined to be the first character position of the 16th column.

The direction of the active position of the cursor movement control code such as APDR, APUR, APF, APB, and N-APF in case of the vertical writing is determined based on the vertical column which corresponds to the character display direction. Specifically, it is defined such as down=left direction, up=right direction, forward=lower direction, and backward=upper direction. The APDR is defined as a control code for moving the display position to the position of the upper most character (a first row position) of the just left column, and the APUR is defined as a control code for moving the display position to the position of the uppermost character (a first row position) of the just right column.

In case of the vertical writing, the control code for roll-up of 2 to 5 columns is a code for displaying the contents of a window with scrolling of the same for one column in the right direction within the window including the right side columns of 2 to 5 including the present character display position (the position of the cursor). In operation, the very right column among the selected columns of the window disappears from the screen by scrolling, and the very left column is replaced by the character column decoded most recently. In using this control code, a separate APDR code for moving the display position to the uppermost character position of the left column in case of the vertical writing is not required, and all the regions outside the window of 2 to 5 columns are erased from the screen with a transparent color.

The control code for roll-down of 2 to 5 columns is a code for displaying the contents of a window with scrolling of the same for one column in the left direction within the window including the left side columns of 2 to 5 including the present character display position (the position of the cursor). In operation, the very left column among the selected columns of the window disappears from the screen by scrolling, and the very right column is replaced by the character column decoded most recently. In using this control code, a separate APUR code for moving the display position to the uppermost character position of the right column in case of the vertical writing is not required, and all the regions outside the window including 2 to 5 columns are erased from the screen with a transparent color.

Details of the control code for additional information will now be explained.

The additional information control code is transmitted in the unit of a page, and classified into a 'page start' control code and a 'page end' control code for page process. The 'page start' corresponds to 2-row roll-up of the caption words, and the 'page end' corresponds to 2-row roll-down of the caption words.

Page start: This represents the start of one page of the additional information, and the receiver starts to store the corresponding page when the page start control code is received. If the page start control code is not received at the start of a page, all data of this page will be disregarded.

Page end: This represents the end of one page of the additional information, and the receiver displays on the screen the data of the received page when the page end control code is received.

When the row change of the additional information is required, one code among the APDR, APUR, and column position designation control codes should be necessarily transmitted.

Before a page of the additional information data is displayed on the screen, the picture should be erased by a ground color of the page to be displayed, and thus the ground color is required to be transmitted for a page. The ground color code coming just after the 'page start' code identifies the ground color of the page, but if the ground color code does not come just after the 'page start' code, the ground color of the previous page is determined as the ground color of the present page.

The vertical writing is used just in the event that caption words for information such as news have already been displayed on the lower portion of the screen, and thus it is usually disregarded. Also, the roll-up of 3 to 5 rows and the roll-down of 3 to 5 rows are disregarded.

Discrimination and process of an effective code will be performed.

The receiver decodes the caption signal, discriminates and processes an effective code in the following order:

1) An input code is discriminated as the effective code only when D7 and D6 are the same.
2) Whether or not D17 is the same as $D0 \oplus D1 \oplus D2 \oplus D3 \oplus D4 \oplus D5 \oplus D6 \oplus D7 \oplus D8 \oplus D9 \oplus D10 \oplus D11 \oplus D12 \oplus D13 \oplus D14 \oplus D15 \oplus D16$ is checked, and if so, the input code is determined as the effective code.
3) If D5 and D6 are (0,1), and D14 and D15 are (0,0), the input code is determined as a control code. If D5 and D6 are (0,1), (1,0), or (1,1), and D14 and D15 are (0,1),(1,0) or (1,1), the input code is determined as a character code. If one pair of D5, D6, and D14, D15 are (0,0), and the other pair are (0,1), (1,0), or (1,1), the input code is determined as an error since it is not possible that the control code and the character code are simultaneously received.
4) If the input code is discriminated as the character code at step 3), it is checked whether or not D8 is the same as $D0 \oplus D1 \oplus D2 \oplus D3 \oplus D4 \oplus D5 \oplus D6 \oplus D7$. If so, determined that the discriminated code is an error.
5) If it is determined that the discriminated character code is not an error at step 4), it is identified whether or not the character code is defined by KSC 5601. If not, '?' or '■' is displayed, while if so, the corresponding character is displayed on the screen.
6) If the input code is discriminated as a control code at step 3), it is checked whether or not D0 is the same as $D1 \oplus D2 \oplus D3 \oplus D9$, and whether or not D4 is the same as $D1 \oplus D2 \oplus D11 \oplus D12$ in the LSWord. If it is checked that either of them is not the same, the control code is determined as an error.
7) If it is determined that the discriminated code is not an error at step 6), it is identified whether or not the control code is defined in the control code table of FIG. 5. If not, the control code is determined as an error, while if so, repeated transmission of the same LSWord and MSWord is waited for.
8) If the same LSWord and MSWord are repeatedly transmitted, application of the control code is performed.

The effective code discrimination and process as described above represents the preferred embodiment of the present invention, and any modification thereof will be possible. For example, the combination of the parity of the control code may be differently determined. Especially, various methods for preventing the error of the control code may be implemented.

The effect of the present invention as described above will now be explained in detail.

By the combination of the above-described control codes, the captioning has three modes available, including scroll of caption words, pop-on of caption words, and display of additional information.

If the roll-up and roll-down control codes are combined in the horizontal and vertical writings, the caption scroll is produced in four directions of upper, lower, left, and right sides.

Here, the caption roll display in the upper direction in case of the horizontal writing will be explained, while the movement in the lower direction will be omitted. A successive transmission code line includes "black ground—black ground—white character—white character—horizontal writing—horizontal writing—10th row—10th row—2nd column—2nd column—on-display—on-display —"da"—"um"—"un"—space—R—o—l—l—"pyo"—"shi"—"bup"—"eui"—space—"de"—"ei"—"ta"—space—"jun"—"song"—"ae"—". Here and hereafter, each character or wording in quotation marks represents transliteration of one Hangul character or wording. Accordingly, as shown in FIG. 10, white characters are displayed on a black ground of the screen. Thereafter, if another successive transmission code line of "2-row roll-up—2-row roll-up —"dae"—"han"—space—"ye"—"rul"—space—"bo"—"in"—space—"gut"—"ei"—"da"—" follows, one character row is rolled up on the screen as shown in FIG. 11. In the same manner, if another successive transmission code line of "2-row roll-up—2-row roll-up —"to"—space—"han"—space—"jul"—"eul"—space—R—o—l—l—u—p—space—"shi"—"kin"—"da"". follows, the character row of the 9th row is erased, and the remaining rows are scrolled up for one row as shown in FIG. 12.

Meanwhile, the caption roll display in the left direction in case of the vertical writing will be explained, while the caption roll display in the right direction will be omitted. A successive transmission code line includes "off-display—off-display—black ground—black ground—white character—white character—vertical writing—vertical writing—2nd row—2nd row—15th column—15th column—on-display—on-display —"ei"—"bun"—"ae"—"nun"—space—"se"—"ro"—"seu"—"gi"—APDR-APDR-R—o—l—l—"pyo"—"gi"—"eui"—space—"ye"". Accordingly, as shown in FIG. 13, white characters are vertically displayed on a black ground of the screen. Thereafter, if another successive transmission code line of "2-column roll-up—2-column roll-up—APDR—APDR "rul"—space—"bo"—"in"—space—"gut"—"ei"—"da"". follows, one character column is scrolled in the left direction of the screen as shown in FIG. 14.

The pop-on function is mainly used for displaying the words on the position of a corresponding actor/actress in a drama. According to this function, the transmitted caption data is first stored in a receiving buffer, and then read out and displayed on the screen by the 'on-screen' control code. For example, a successive transmission code line includes "receive/store—receive/store—2nd row—2nd row—yellow character—yellow character—2nd column—2nd column—transparent ground—transparent ground —"eui"—"ge"—space—"meo"—"ya"—?—6-character APF—6-character APF —"han"—"gul"—"ja"—"mak"—"ei"—"gi"—!—off-display—off-display—on-display—on-display". Accordingly, the caption words are displayed on the screen corresponding to the personage in the picture as shown in FIG. 15. Thereafter, as shown in FIG. 16, next caption words are displayed by another successive transmission code line includes "receive/store—receive/store—3rd row—3rd row—2nd column—2nd column—"jal"—space—"mo"—"ru"—"get"—"seo"—2nd row—2nd row— 14th column—14th column—"gu"—"rae"—?—3rd row—3rd row—11th column—11th column—"shil"—"eun"—space—"na"—"do"—space—"mol"—"la"—. —(lapse of several seconds)—off-display—off-display—on-display—on-display—lapse of 5 seconds—off-display —off-display". If following caption words are not received after about 5 seconds elapse, which may be varied in accordance with the amount of caption words, the displayed caption words are erased from the screen by the off-display control code.

FIGS. 17 and 18 show examples of additional information display. First, a successive transmission code line for a weather forecast includes "page start—page start—green ground—green ground—yellow character—yellow character—2nd row—2nd row—4th column—4th column—{==S weather SS forecasts==}—4th row—4th row—4th column—4th column—{"se oul" S "mal kum" SS 0"do"}—APDR—APDR—6-character APF—6-character APF—{"dae jon" S "hu rim" SS 2"do"}—APDR—APDR—4th column—4th column—{"kwang ju" S "hu rim" SS 4 "do"}—APDR—APDR—6-character APF—6-character APF—{"pu san" S "bi" SSS 3 "do"}—APDR—APDR—4th column—4th column—{"dae gu" S "bi" SSS 3"do"}—APDR—APDR—4th column—4th column—{"chun cheon" S "nun"SS 4"do"}—page end—page end".

A successive transmission code line for information on tomorrow's sports games includes "page start—page start—2nd row—2nd row—4th column—4th column—APF—APF—{<"nae il eui kyung ki an nae">}—4th row—4th row—2nd column—2nd column—{"chook gu-oh hu 2 shi (su won che yuk kwan)"}—APDR—APDR—{"nong gu-oh hu 4 shi (shil nae che yuk kwan)"}—APDR—APDR—2nd column—2nd column—{"bae gu-oh jun 10 shi (hak saeng che yuk kwan)"}—APDR—APDR—{"tak gu-oh jun 11 shi (seo ul che yuk kwan)"}—APDR—APDR—{"ya gu-oh jun 5 shi (cham shil che yuk kwan)"}—APDR—APDR—3rd column—3rd column—{"we nae yong eun nal si gwan gye ro chi so del su"}—APDR—APDR—2nd column—2nd column—{"it seum ni da"}".

In case of a multichannel audio system such as a movie, two-language caption words can be broadcast using two channels of odd and even fields. In this case, the kinds of languages may be discriminated by the row number of KSC 5601, and then icon-displayed. In the event that caption words of one language and caption words of two languages are broadcast from a broadcasting station, a corresponding logogram may be displayed for about one minute at the start of the corresponding program as in the multichannel system.

In order to support the pop-on mode, the receiver should employ two display memories. In the event that the 'off-display' or 'on-display' control code is not received, or an error is generated in receiving the code within 10 seconds after the last pop-on caption words are displayed, the presently displayed pop-on caption words may be compulsorily erased from the screen.

In the event that caption words of two languages are broadcast, the receiver should display the caption words of one language selected by a user. The receiver may also display the caption words of both two languages by separately displaying the caption words of the other language on a specific region of the screen.

Figure 19:
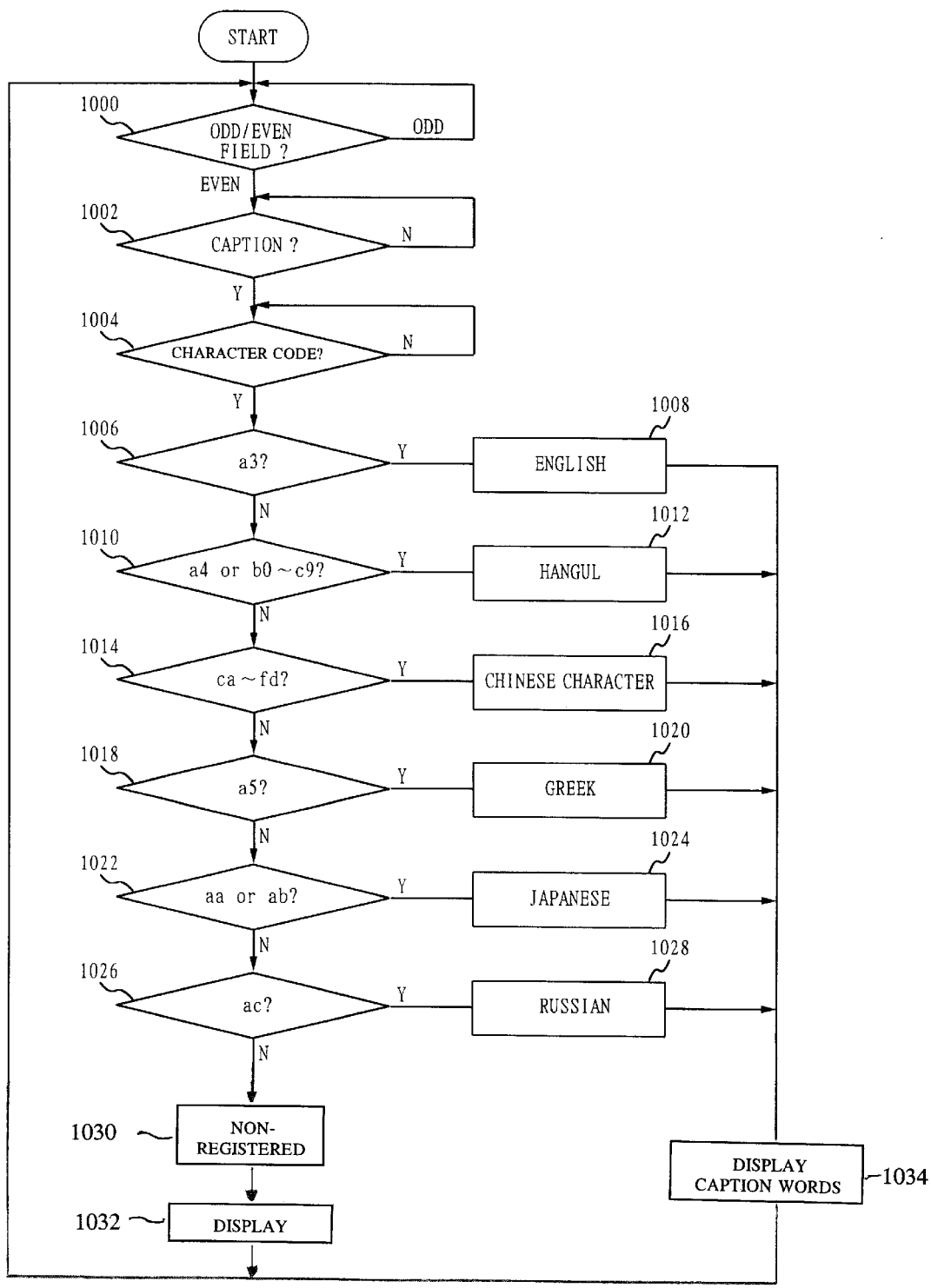
FIG. 19 is a flow diagram explaining the sub-channel language discriminating method according to the present invention.

Referring to FIG. 19, the caption processing section in the receiver for receiving the caption signal having the character data for a main-channel (odd field) and a sub-channel (even field) detects the odd field and even field of the television video signal in accordance with the sync signal (step 1000). If the detected field is the even field, the caption processing section checks if it corresponds to the caption signal (step 1002), and then checks whether the caption signal is the control code or the character code (step 1004). If the caption signal is the character code, the caption processing section classifies it as the sub-channel signal, and discriminates the value of the character code, based on the KSC 5601 Hangul completion type code value. At this time, as shown in the code table of FIG. 6A, the caption processing section compares and checks if the code value of the upper byte is identical to one of a3 (step 1006), a4 or b0 to c9 (step 1010), ca to fd (step 1014), a5 (step 1018), aa or ab (step 1024), and ac (step 1028). If the code value of the upper byte is identical to a3 in step 1006, then the character signal is discriminated as English, in step 1008. If the code value of the upper byte is identical to a4 or b0–c9, then the character signal is discriminated as Hangul, in step 1012. If the code value of the upper byte is identical to ca-fd in step 1014, then the character signal is discriminated as Chinese, in step 1016. If the code value of the upper byte is identical to a5 in step 1018, then the character signal is discriminated as Greek, in step 1020. If the code value of the upper byte is identical to aa or ab in step 1022, then the character signal is discriminated as Japanese, in step 1024. If the code value of the upper byte is identical to ac in step 1026, then the character signal is discriminated as Russian, in step 1028. If the code value is not identical to one of a3, a4, b0–c9, ca-fd, a5, aa, ab or ac, the caption processing section discriminates the character signal as a non-registered language (step 1030), and displays on the screen signs or words for indicating that the received caption is of a non-registered language (step 1032). If the character signal is discriminated as a registered language at steps 1008, 1012, 1016, 1020, 1024 or 1028, the caption words of the corresponding language are displayed on the screen (step 1034).

By selection of the user, the opaque ground may be changed to the semitransparent ground.

It is recommended that the additional information is displayed per page on the screen. The displayed information may be rolled up row by row by selection of the user. In displaying the additional information, the user may compulsorily designate the transparent ground. If the displayed additional information page is held by the user, second page data is stored in a buffer, and data of all other pages received thereafter are disregarded until the holding state is released.

If the holding state is not released over 15 seconds, the receiver may automatically release the holding state, or may perform an iconoscope display to indicate the holding state.

The character attribute designated in the additional information is typically released by the input of a normal control code. If the 'page end' control code is received in a state that the normal control code has not yet been received by error, the character attribute should be restored to the normal state.

If data codes are continually received without the 'page end' control code until they exceed 10 rows in the additional information page (i.e., if the data code is received after the APDR code is received), the display position is moved to the first character position of the 10th row, and the caption words are repeatedly overwritten on the 10th row. However, the row and column position designation and the character writing thereon comply with the rules of the general control code.

The broadcasting system is made in such a manner that symbol lines are properly arranged so that a control code for the display position is transmitted every 4 seconds since the control code is not identified when the receiver starts to operate. If the accurate position and the operating mode are not identified after the receiver operates, a normalized receiver displays the received character code on a default position. Thereafter, if a control code which is transmitted every 4 seconds is received, the receiver erases the presently displayed caption words, and then performs a caption display in accordance with a new control code.

Information having no relation with caption information of the broadcasting program should be transmitted as the additional information code. At this time, the broadcasting system should establish the priority order of the caption information and the additional information. The additional information should be transmitted in cycles. Also, it is recommended that in using the additional information, a page is constructed so as to display the information on the screen per frame.

In case of the caption broadcasting using the pop-on display method, a control code should be transmitted to properly erase the displayed caption. Specifically, if a subsequent caption signal (audio signal) is not produced after about 5 seconds (which may be varied according to the amount of caption) elapse since the caption words are displayed on the screen, it is preferable that the 'off-display' control code is transmitted to erase the displayed caption words.

The receiver displays the received character code on the default position of each mode if the accurate position and the operation mode are not identified. Thereafter, if the horizontal/vertical writing designation code and the row/column position designation code are received, the receiver erases the previously displayed caption words and performs a caption display operation according to the new control code.

If the user changes the television channel while using the caption words and additional information, the captioning is released and only the television picture is displayed on the screen even though a caption signal is transmitted through the changed television channel.

In the event that a specific control code is not received at a point when the user selects the caption, the receiver maintains the attribute-release state, and immediately displays by the horizontal writing white characters on a black ground, starting from the first column position of the 10th row in the caption display region.

A changeover from the caption word mode to the additional information mode is performed at a point when the additional information mode is selected, or at a receiving point of the first page start control code after the selection of the additional information mode. If a specific control code is not received at a point when the user selects the additional information, the receiver releases the attribute of the character, and displays by the horizontal writing white characters on a black ground, starting from the first column position of the first now.

The receiver may employ several extra memories to store several pages of the additional information, or employ a page memory for storing a next page since at least one page can be displayed using the memory for pop-on mode of the caption words. In displaying the additional information, the displayed page is entirely erased from the screen, and then a new page is displayed every time when the page is changed.

As described above, according to the present invention, since the transmission code of syllable characters such as Hangul is not transmitted as a plurality of phonemic codes which constitute a syllable, but is transmitted by coding the syllable itself to 2 words, the character transmission rate can be improved and the caption words with various languages can be simultaneously displayed. Further, since the error correction capability of data is increased, the receiving sensitivity of the caption broadcasting signal can be improved even in the mountainous districts.

Furthermore, according to the present invention, it is discriminated if the caption data which is encoded and received through the sub-channel in accordance with the KSC 5601 code value corresponds to one of Hangul, English, Japanese, Chinese character, Greek, and Russian, and if not, signs or words are displayed on the screen to indicate that the received caption corresponds to a non-registered language, providing the viewer convenience in use.

While the present invention has been described and illustrated herein with reference to the preferred embodiments thereof, it will be understood by those skilled in the art that various changes in form and details may be made therein without departing from the spirit and scope of the invention.

What is claimed is:

1. A closed-caption broadcasting method comprising the steps of:

receiving first language character information of a first language and corresponding control information;

producing a first language control code of 2 words by combining said first language control information with a first mode control bit and a first parity bit, and producing a first language character code of 2 words including a syllable character completion type code by combining said first language character information with a second mode control bit and a second parity bit;

receiving second language character information of a second language and corresponding control information;

producing a second language control code of 2 words by combining said language control information with a third mode control bit and a third parity bit, and producing a second language character code of 2 words including said syllable character completion type code by combining said second language character information with a fourth mode control bit and a fourth parity bit;

digitally modulating said first language control code and character code and, in response, generating a first digital-modulated caption signal;

discriminating a field of a television video signal;

selecting said first caption signal if said field is discriminated as an odd field, selecting said second caption signal if said field is discriminated as an even field; and encoding said selected caption signal in a scanning line of said television video signal which does not affect said television video signal, for transmission of said caption signal.

2. A closed-caption broadcasting method as claimed in claim 1, wherein each of said 2 words is composed of 9 bits.

3. A closed-caption broadcasting method as claimed in claim 1, wherein said syllable character completion type code is a Hangul completion type KSC 5601 code.

4. A closed-caption broadcasting method as claimed in claim 1, wherein said scanning line which does not affect said television video signal is one of a 262nd line of an odd field and a 525th line of an even field.

5. A closed-caption broadcasting method as claimed in claim 1, wherein each of said first and second caption signals comprises:
   a bit clock sync signal which is a first sine wave of a predetermined period, and has a frequency obtained by dividing a chrominance subcarrier of said television video signal at a predetermined rate;
   a word start signal which is a second sine wave of one period, and has a frequency obtained by dividing said bit clock sync signal at a predetermined rate; and
   an 18-bit data signal modulated to a third sine wave having a frequency lower than said frequency of said bit clock sync signal and higher than said frequency of said word start signal.

6. A closed-caption broadcasting method as claimed in claim 5, wherein:
   said step of digitally-modulating said first language control code and character code comprises modulating each of said data signals by a binary phase shift keying (BPSK) method; and
   said step of digitally-modulating said second language control code and character code comprises modulating each of said data signals by a binary phase shift keying (BPSK) method.

7. A closed-caption broadcasting method as claimed in claim 5, wherein said frequency of said bit clock sync signal is obtained by dividing said frequency of said chrominance subcarrier by 4.

8. A closed-caption broadcasting method as claimed in claim 5, wherein said frequency of said word start signal is obtained by dividing said frequency of said bit clock sync signal by 4.

9. A closed-caption broadcasting method as claimed in claim 5, wherein said sine wave frequency of said data signal is obtained by dividing said frequency of said bit clock sync signal by 2.

10. A closed-caption broadcasting method as claimed in claim 5, wherein said bit clock sync signal is composed of 6 periods.

11. A closed-caption broadcasting method as claimed in claim 5, wherein a maximum level of each of said first and second caption signals is 90±IRE.

12. A closed-caption broadcast receiving method comprising the steps of:
   detecting a sync signal of a received television signal;
   extracting a caption signal encoded in a scanning line of said television signal in response to said detected sync signal;
   restoring digital data from said extracted caption signal;
   detecting for an error of said restored data;
   storing in a first RAM (random access memory) first data of an odd field of said error-detected data, and storing in a second RAM data of an even field of said error-checked data;
   reading out one of said first and second data from a corresponding one of said first and second RAMs;
   decoding a control code and a character code from said read out first or second data, reading out character data corresponding to said character code from a font ROM (read only memory), wherein said character data is stored in said font ROM based on a syllable character completion type code, and storing said read out character data in a display memory; and
   converting said character data stored in said display memory into a video signal in response to said decoded control information, to display said video signal on a display screen.

13. A closed-caption broadcast receiving method as claimed in claim 12, wherein:
   said decoding and reading step comprises the substeps of decoding said control code and character code of said second data, and
   discriminating whether a character code value of said character code of said second data read out from said second RAM corresponds to a registered language if said data is said character code; and
   said closed-caption receiving method further comprising the step of displaying on said display screen an indication that said second data corresponds to a non-registered language if said character code value does not correspond to said registered language.

14. A closed-caption broadcast receiving method as claimed in claim 13, wherein said language discriminating step discriminates said second data as said non-registered language if said second data does not correspond to any one of Hangul, English, Greek, Japanese, Chinese, and Russian, utilizing an upper byte value of a KSC 5601 Hangul completion type code of said character code of said second data.

15. A closed-caption broadcasting method, comprising the steps of:
   receiving first language control information and character information indicative of a first language and second language control information and character information;
   producing a first language control code of two words by combining said first language control information with a first mode control bit and a first parity bit, a first language character code of two words including a syllable character completion type code by combining said first language character information with a second mode control bit and a second parity bit, a second language control code of two words by combining said second language control information with a third mode control bit and a third parity bit, and a second language character code of two words including said syllable character completion type code by combining said second language character information with a fourth mode control bit and a fourth parity bit; and
   coding said first language control and character codes into an odd field channel of a television image signal and coding said second language control and character codes into an even field of said television image signal.

16. A closed-caption broadcasting method as claimed in claim 15, wherein said step of coding comprises the steps of:
   counting a horizontal sync signal of said television image signal and resetting the count by a vertical sync signal of said television image signal;
   generating a switching control signal based upon the count of said horizontal sync signal;
   generating a field signal by discriminating between an odd field and an even field of said television image signal;
   generating a caption signal by alternately enabling transmission of said first language control and character codes and said second language control and character codes based upon said field signal; and coding said caption signal in said television image signal based upon said switching control signal.

17. A closed-caption broadcasting method as claimed in claim 15, wherein said syllable character completion type code is a Hangul completion type KSC 5601 code.

18. A closed-caption broadcasting method as claimed in claim 15, wherein said even field channel is a 262nd line of said television image signal and said odd field channel is a 525th line of said television image signal.

19. A closed-caption broadcasting method as claimed in claim 15, wherein said caption signal comprises:

a bit clock sync signal which is a first sine wave of a predetermined period, and has a frequency obtained by dividing a chrominance subcarrier of said television signal at a predetermined rate;

a word start signal which is a second sine wave of one period, and has a frequency obtained by dividing said bit clock sync signal at a predetermined rate; and an 18-bit data signal modulated to a sine wave having a frequency lower than said frequency of said bit clock sync signal and higher than said frequency of said word start signal.

20. A closed-caption broadcasting method as claimed in claim 15, further comprising the steps of:

transmitting said television image signal encoded with said caption signal as a transmission signal;

receiving said transmission signal as a received television signal;

detecting horizontal and vertical sync signals of said received television signal;

extracting said caption signal encoded in said television signal by counting said horizontal sync signal of said received television signal in response to said vertical sync signal of said received television signal;

storing in a first memory said caption signal in said odd field channel as first data, and storing in a second memory said caption signal in said even field channel as second data;

decoding said first language control code of said first data read out from said first memory or said second language control code of said second data read out from said second memory, decoding said first language character code from said read out first data or said second language character code from said read out second data, reading out character data corresponding to said read out first or second language character code, and storing said read out character data in a third memory; and converting said character data stored in said third memory into a video signal to display said video signal on a display screen.

21. A closed-caption broadcasting method as claimed in claim 20, wherein said decoding step comprises the steps of:

determining whether a character code value of said read out second language character code corresponds to a registered language; and generating an indicator that said read out second language character code corresponds to a non-registered language if said read out second language character code does not correspond to a registered language.

22. A closed-caption receiving method, comprising the steps of:

detecting horizontal and vertical sync signals of a received television signal;

extracting a caption signal encoded in said television signal by counting said horizontal sync signal of said received television signal in response to said vertical sync signal of said received television signal;

storing in a first memory said caption signal in an odd field channel of said received television signal as first data of a first language, and storing in a second memory said caption signal in an even field channel of said received television signal;

decoding a first language control code of said first data read out from said first memory or a second language control code of said second data read out from said second memory, decoding a first language character code from said read out first data or a second language character code from said read out second data;

determining whether said second language character code is one of a plurality of registered languages if said second data is read out from said second memory;

reading out character data corresponding to said read out first language character code if said first language character code is read out from said first memory, reading out character data corresponding to said read out second language character code if said second language character code is read out from said first memory and said second language character code is one of said plurality of registered languages;

storing said read out character data in a third memory; and converting said character data stored in said third memory into a video signal to display said video signal on a display screen.

23. A closed-caption receiving method as claimed in claim 22, further comprising the step of displaying an indicator that said caption signal of said even field channel is a non-registered language if said second language character code does not correspond to any of said plurality of registered languages.

24. A closed-caption broadcasting apparatus to encode caption information in a television image signal, comprising:

a character information input unit to receive first language control information and character information indicative of a first language and second language control information and character information;

a caption producing unit to produce a first language control code of two words by combining said first language control information with a first mode control bit and a first parity bit, a first language character code of two words including a syllable character completion type code by combining said first language character information with a second mode control bit and a second parity bit, a second language control code of two words by combining said second language control information with a third mode control bit and a third parity bit, and a second language character code of two words including said syllable character completion type code by combining said second language character information with a fourth mode control bit and a fourth parity bit; and an encoder to code said first language control and character codes into an odd field channel of said television image signal and to code said second language control and character codes into an even field of said television image signal.

25. A closed-caption broadcasting apparatus as claimed in claim 24, wherein said encoder comprises:

a synchronous counter unit to count a horizontal sync signal of said television image signal and resetting the count by a vertical sync signal of said television image signal;

a window signal generating unit to generate a switching control signal based upon the count of said horizontal sync signal;

a field discriminating unit to generate a field signal by discriminating between an odd field and an even field of said television image signal;

a first switching unit to generate a caption signal by alternately enabling transmission of said first language control and character codes and said second language control and character codes based upon said field signal; and a second switching unit to alternately enable transmission of said caption signal and said television image signal based upon said switching control signal.

26. A closed-caption broadcasting apparatus as claimed in claim 24, wherein said syllable character completion type code is a Hangul completion type KSC 5601 code.

27. A closed-caption broadcasting apparatus as claimed in claim 24, wherein said even field channel is a 262nd line of said television image signal and said odd field channel is a 525th line of said television image signal.

28. A closed-caption broadcasting apparatus as claimed in claim 24, wherein said caption signal comprises:

a bit clock sync signal which is a first sine wave of a predetermined period, and has a frequency obtained by dividing a chrominance subcarrier of said television signal at a predetermined rate;

a word start signal which is a second sine wave of one period, and has a frequency obtained by dividing said bit clock sync signal at a predetermined rate; and an 18-bit data signal modulated to a sine wave having a frequency lower than said frequency of said bit clock sync signal and higher than said frequency of said word start signal.

29. A closed-caption broadcasting apparatus as claimed in claim 24, further comprising:

a transmitter to transmit said television image signal encoded with said caption signal as a transmission signal;

a receiving unit to receive said transmission signal as a received television signal;

sync separator to detect horizontal and vertical sync signals of said received television signal;

a data extractor to extract said caption signal encoded in said television signal by counting said horizontal sync signal of said received television signal in response to said vertical sync signal of said received television signal;

a memory unit; and a caption control unit to store in said memory unit said caption signal in said odd field channel as first data, to store in said memory unit said caption signal in said even field channel as second data, to decode a first language control code of said first data read out from said memory unit and a second language control code of said second data read out from said memory unit, decoding a first language character code from said read out first data and a second language character code from said read out second data, and to convert said character data stored in said memory unit into a video signal for display of said video signal.

30. A closed-caption broadcasting apparatus as claimed in claim 29, wherein said caption control unit determines whether a character code value of said read out second language character code corresponds to a registered language, and generates an indicator that said read out second language character code corresponds to a non-registered language if said read out second language character code does not correspond to a registered language.

31. A closed-caption receiving apparatus for receiving caption information from a received television signal, comprising:

a sync separator to detect horizontal and vertical sync signals of said received television signal;

a data extractor to extract a caption signal encoded in said television signal by counting said horizontal sync signal of said received television signal in response to said vertical sync signal of said received television signal;

a memory unit; and a caption control unit to store in said memory unit said caption signal in an odd field channel of said received television signal as first data of a first language, to store in said memory unit said caption signal in an even field channel of said received television signal, to decode a first language control code of said first data read out from said memory unit and a second language control code of said second data read out from said memory unit, to decode a first language character code from said read out first data and a second language character code from said read out second data, to determine whether said second language character code is one of a plurality of registered languages if said second data is read out from said memory unit, to read out character data corresponding to said read out first language character code if said first language character code is read out from said memory unit, to read out character data corresponding to said read out second language character code if said second language character code is read out from said memory unit and said second language character code is one of said plurality of registered languages, to store said read out character data in said memory unit, and to convert said character data stored in said memory unit into a video signal for display of said video signal.

32. A closed-caption receiving apparatus as claimed in claim 31, wherein said caption control unit generates an indicator that said caption signal of said even field channel is a non-registered language if said second language character code does not correspond to any of said plurality of registered languages.

* * * * *